US012657343B2

(12) United States Patent
Singh et al.

(10) Patent No.: US 12,657,343 B2
(45) Date of Patent: Jun. 16, 2026

(54) AUTOMATIC DE-IDENTIFICATION OF SENSITIVE CONVERSATIONAL AUDIO DATA

(71) Applicant: Oracle International Corporation, Redwood Shores, CA (US)

(72) Inventors: Praphul Singh, Pleasanton, CA (US); Neil Jonathon Hauge, Raleigh, NC (US); Gyan Shankar, Fremont, CA (US); Wan Jie Chen, Renton, WA (US); Irfan Bulu, Sartell, MN (US); Srinivasa Phani Kumar Gadde, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/948,653

(22) Filed: Nov. 15, 2024

(65) Prior Publication Data

US 2026/0141113 A1 May 21, 2026

(51) Int. Cl.
*G06F 21/62* (2013.01)
*G10L 15/26* (2006.01)

(52) U.S. Cl.
CPC .......... *G06F 21/6254* (2013.01); *G10L 15/26* (2013.01)

(58) Field of Classification Search
CPC ............................. G06F 21/6254; G10L 15/26
See application file for complete search history.

(56) References Cited

U.S. PATENT DOCUMENTS 11,580,951 B2 * 2/2023 Gkoulalas-Divanis ...................... G06F 21/6254
11,816,243 B2 11/2023 Lai et al.
12,045,373 B2 7/2024 Satish et al.
12,197,859 B1 1/2025 Malviya et al.
(Continued)

OTHER PUBLICATIONS

"DeID-GPT: Zero-shot Medical Text De-Identification by GPT-4", Retrieved from https://arxiv.org/html/2303.11032v2, Dec. 21, 2023, pp. 1-41.

(Continued)

*Primary Examiner* — Harunur Rashid
(74) *Attorney, Agent, or Firm* — Invoke

(57) ABSTRACT

Techniques for automatically de-identifying sensitive information in audio conversations by combining un-transcribed voice activity detection (VAD) with large language model (LLM) analysis are disclosed. An audio de-identification system processes speech-to-text transcriptions while identifying segments where automatic speech recognition (ASR) failed to transcribe spoken content. These un-transcribed segments are represented as placeholders in prompts sent to an LLM, which analyzes the surrounding textual context to determine if sensitive information (such as PII or PHI) was likely spoken during these gaps. When sensitive content is identified, the system modifies the corresponding audio segments through an audio identification tactic. This approach addresses the technical challenge of incomplete de-identification in automated audio processing by leveraging LLMs' contextual understanding to detect sensitive information in segments that traditional ASR systems miss, particularly in scenarios involving poor audio quality or diverse accents. The result is a more comprehensive and reliable audio de-identification system.

18 Claims, 10 Drawing Sheets

(56) References Cited

U.S. PATENT DOCUMENTS

| | | | | |
|---|---|---|---|---|
| 12,259,984 | B2 | 3/2025 | Luitjens et al. | |
| 2006/0190263 | A1* | 8/2006 | Finke | G16H 15/00 704/E15.026 |
| 2010/0332484 | A1 | 12/2010 | Saito | |
| 2015/0324413 | A1 | 11/2015 | Gubin et al. | |
| 2022/0414262 | A1 | 12/2022 | Degioanni et al. | |
| 2023/0386456 | A1* | 11/2023 | Weston | G06N 20/00 |
| 2023/0409749 | A1* | 12/2023 | Li | G06V 20/70 |
| 2023/0410223 | A1 | 12/2023 | Dobson et al. | |
| 2023/0418978 | A1* | 12/2023 | Sublett | G06F 40/174 |
| 2024/0005936 | A1* | 1/2024 | Hvidsten | G10L 21/007 |
| 2024/0185039 | A1 | 6/2024 | Hughes | |
| 2024/0265114 | A1 | 8/2024 | Lambotte | |
| 2025/0245384 | A1* | 7/2025 | Wadhawan | G06F 21/6254 |
| 2025/0315555 | A1 | 10/2025 | Huang et al. | |

OTHER PUBLICATIONS

"Healthcare NLP Release Notes", Retrieved from https://nlp.johnsnowlabs.com/docs/en/spark_nlp_healthcare_versions/licensed_release_notes, Retrieved on Dec. 13, 2024, pp. 1-19.

"Medical Data de-identification", Retrieved from https://imerit.net/medical-data-de-identification-ai-phi-removal-automation/, Retrieved on Dec. 13, 2024, pp. 1-7.

"Presidio: Data Protection and De-identification SDK", Retrieved from https://microsoft.github.io/presidio/, Retrieved on Dec. 13, 2024, pp. 1-3.

"Propel Health AI—Empowering the Healthcare Ecosystem with Data and AI", Retrieved from https://www.propelhealth.ai/platform, Retrieved on Dec. 13, 2024, pp. 1-3.

"Support LLM based de-identification", Retrieved from https://github.com/microsoft/presidio/issues/1234, Dec. 17, 2023, pp. 1-8.

Awati, "Accurate Deidentified PHI with John Snow Labs' Health Information De-identification Service", Retrieved from https://www.johnsnowlabs.com/accurate-medical-data-de-identification-with-john-snow-labs-de-identification-service/, Jan. 26, 2022, pp. 1-16.

Dernoncourt et al., "De-identification of patient notes with recurrent neural networks", Journal of the American Medical Informatics Association, vol. 24, No. 3, 2017, pp. 596-606.

Falconer S., "Advanced Techniques for De-Identifying PII and Healthcare Data", Retrieved from https://www.skyflow.com/post/de-identifying-pii-and-healthcare-data, May 20, 2024, pp. 1-12.

John et al., "LLM Data Privacy: How to Implement Effective Data De-identification", Aug. 20, 2024, pp. 1-11.

Kermany et al., "Automating PHI Removal from Healthcare Data With Natural Language Processing", Retrieved from https://www.databricks.com/blog/2022/06/22/automating-phi-removal-from-healthcare-data-with-natural-language-processing.html, Jun. 22, 2022, pp. 1-14.

Kocaman et al., "Beyond Accuracy: Automated De-Identification of Large Real-World Clinical Text Datasets", Dec. 13, 2023, pp. 1-13.

Madukayil R., "Introducing Segmed's LLM-based Data De-identification Playground", Retrieved from https://www.segmed.ai/resources/blog/llm-based-data-de-identification, Retrieved on Dec. 13, 2024, pp. 1-3.

Mestari et al., "Preserving data privacy in machine learning systems", Computers & Security, vol. 137, 2024, 103605, pp. 1-22.

Neamatullah et al., "Automated de-identification of free-text medical records", BMC Medical Informatics and Decision Making, vol. 8, No. 32, Jul. 24, 2008, pp. 1-17.

Negash et al., "De-identification of free text data containing personal health information: a scoping review of reviews", International Journal of Population Data Science, vol. 8, No. 1, Dec. 12, 2023, pp. 1-12.

Singh et al., "Generation and De-Identification of Indian Clinical Discharge Summaries using LLMs", Jul. 8, 2024, 21 Pages.

Wiest et al., "Anonymizing medical documents with local, privacy preserving large language models: The LLM-Anonymizer", Jun. 13, 2024, pp. 1-29.

Yu et al., "Developing an automated mechanism to identify medical articles from wikipedia for knowledge extraction", International Journal of Medical Informatics, vol. 141, Jul. 13, 2020, 104234, pp. 1-8.

Staab, R., Vero, M., Balunovic, M., & Vechev, M. (2024). Large language models are advanced anonymizers. arXiv preprint arXiv: 2402.13846. (Year: 2024).

* cited by examiner

TRANSCRIPT 308

00:02:10 - 00:02:12

Dr. Johnson: "Can you describe any other symptoms you've been experiencing, Emily?"

00:02:12 - 00:02:14

Emily: "Well, I've had some dizziness and nausea."

00:02:15 - 00:02:20    } CANDIDATE TIME WINDOW 332

(Inaudible)

00:02:20 - 00:02:22

Dr. Johnson: "I see. Is this something you've dealt with before?"

00:02:22 - 00:02:24

Emily: "Yes, but I thought it had gone away."

TRANSCRIPT 408

00:03:10 - 00:03:15

Alex: "I've been experiencing chest pains and shortness of breath."

00:03:16 - 00:03:21

Dr. Thompson: "We should run some tests to rule out any serious conditions."

00:03:22 - 00:03:36

Alex: "That sounds good. Here's my credit card number for the payment"

00:03:37 - 00:03:37

Dr. Thompson: "Thank you, Alex. I'll make sure the payment is processed. Now, let's talk about the tests we'll be scheduling for you."

PROMPT 418

<PROMPT INSTRUCTIONS>

00:03:10 - 00:03:15

Alex: "I've been experiencing chest pains and shortness of breath."

PLACEHOLDER 420

00:03:16 - 00:03:21

Dr. Thompson: "We should run some tests to rule out any serious conditions."

00:03:22 - 00:03:36

Alex: "That sounds good. Here's my credit card number for the payment <TIMESTAMP1>"

00:03:37 - 00:03:37

Dr. Thompson: "Thank you, Alex. I'll make sure the payment is processed. Now, let's talk about the tests we'll be scheduling for you."

OUPUT 424

{"TIMESTAMP1" : "CREDIT_CARD_NUM"}

FIG. 4

TRANSCRIPT 508

00:05:10 - 00:05:14

Dr. Patel: "Can you tell me more about what's been bothering you lately, Laura?"

00:05:13 - 00:05:17

Laura: "I've been feeling very anxious and it's been hard to focus."

00:05:18 - 00:05:23 } CANDIDATE TIME WINDOW 532

*(Un-transcribed segment where Laura whispers about a sensitive personal issue, not captured by the system due to low volume)*

00:05:23 - 00:05:26

Dr. Patel: "I understand. It's important to address these feelings. Have you talked to anyone about this before?"

PROMPT 518

<PROMPT INSTRUCTIONS>

00:05:10 - 00:05:14

Dr. Patel: "Can you tell me more about what's been bothering you lately, Laura?"

00:05:13 - 00:05:17

Laura: "I've been feeling very anxious and it's been hard to focus."

00:05:18 - 00:05:23

<TIMESTAMP1> ← PLACEHOLDER 520

00:05:23 - 00:05:26

Dr. Patel: "I understand. It's important to address these feelings. Have you talked to anyone about this before?"

FIG. 5

TRANSCRIPT 608

00:10:05 - 00:10:08

Dr. Kim: "David, can you tell me how you've been feeling lately?"

00:10:08 - 00:10:11

David: "Well, I've been really tired and stressed."

00:10:11 - 00:10:15 } CANDIDATE TIME WINDOW 632-1

*(Un-transcribed segment where David hesitates and speaks softly about feeling anxious, which the system misses)*

00:10:15 - 00:10:18

David: "I don't know... it's been hard to concentrate on anything." } CANDIDATE TIME WINDOW 632-2

00:10:19 - 00:10:21

Dr. Kim: "I understand. Can you think of any specific events that may have triggered these feelings?"

00:10:22 - 00:10:26 } CANDIDATE TIME WINDOW 632-3

*(Another un-transcribed segment where David quietly mentions a recent personal issue, missed by the transcription system)*

00:10:26 - 00:10:29

David: "It's just been a lot to handle lately."

FIG. 6

TRANSCRIPT

00:12:00 - 00:12:10
Dr. Miller: "Lisa, based on our discussion, I'd recommend scheduling a specialized test to get more clarity on your condition."
00:12:10 - 00:12:15
Lisa: "Okay, that sounds good. How soon can we do it?"
00:12:15 - 00:12:24
Dr. Miller: "We can arrange it for early next week. I'll have the front desk handle the scheduling."
00:12:24 - 00:12:29
Lisa: "Great. How much will it cost?"
00:12:29 - 00:12:36
Dr. Miller: "It will be $250, which isn't covered by your insurance."
00:12:36 - 00:12:41
Lisa: "That's fine. I can pay now with my credit card."
00:12:41 - 00:12:44
Dr. Miller: "Sure, go ahead."
00:12:44 - 00:12:59
Lisa: "My credit card number is 1234 5678 9012 3456."
00:12:59 - 00:13:04
Dr. Miller: "Thank you, I'll process the payment now."

| TOKEN | START TIME | END TIME |
|---|---|---|
| "1234" | 00:12:50.34 | 00:12:52.00 |
| "5678" | 00:12:52.10 | 00:12:54.20 |
| "9012" | 00:12:54.30 | 00:12:56.60 |
| "3456" | 00:12:56.80 | 00:12:59.55 |

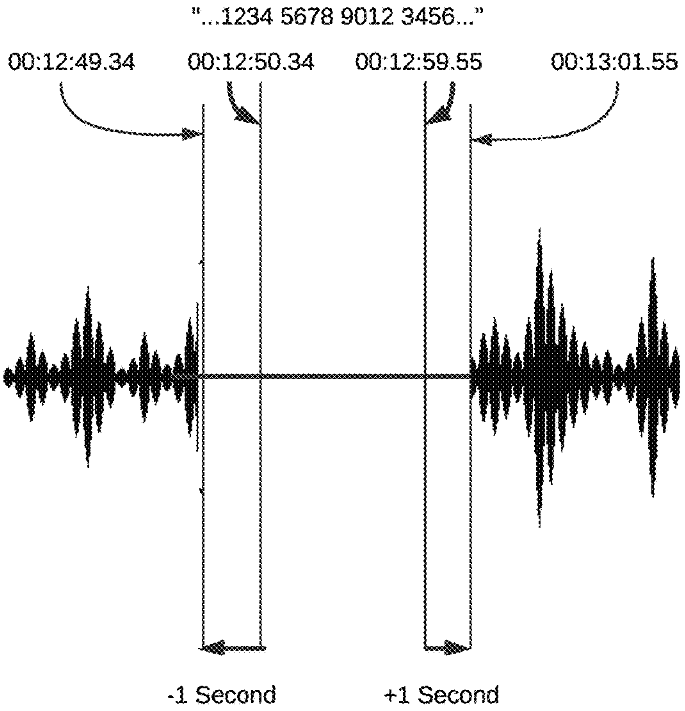

FIG. 7

AUTOMATIC DE-IDENTIFICATION OF SENSITIVE CONVERSATIONAL AUDIO DATA

TECHNICAL FIELD

This disclosure relates generally to computer-implemented data processing. More particularly, this disclosure relates to computer-implemented de-identification of sensitive conversational audio data.

BACKGROUND

De-identification of sensitive data involves removing or obscuring personally identifiable information and other sensitive information from electronic data records. This process aims to protect privacy while allowing data to be used for research or analysis.

Manual de-identification of sensitive data involves human reviewers meticulously examining and redacting personally identifiable information from individual electronic data records. This process requires extensive time investment, as a document requires careful examination for potential identifiers. Costs escalate rapidly due to the labor-intensive nature of the task that requires skilled personnel with knowledge of privacy regulations and domain terminology. Scalability becomes a significant challenge when confronted with large datasets. As volume increases, the time and resources required grow linearly, if not exponentially.

Human reviewers are susceptible to fatigue and errors, particularly when dealing with extensive electronic data records. Consistence in applying de-identification rules across a large corpus proves difficult to maintain. Furthermore, manual processes struggle to keep pace with the ever-increasing generation of electronic data records and other sensitive data sources. The inherent limitations of human processing speed create bottlenecks in data flow, impeding timely analysis and research.

While manual review may be suitable for small, sensitive datasets, the approach quickly becomes impractical for big data applications in healthcare and medical research, financial services, education, and government and public administration. Automated or semi-automated de-identification tools offer more viable solutions for handling large-scale sensitive data de-identification tasks though these methods present their own challenges in terms of accuracy and adaptability to diverse data formats.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

One or more embodiments of the present disclosure are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example of using a large language model (LLM) to analyze and classify sensitive information in un-transcribed audio segments in accordance with one or more embodiments;

FIG. 5 illustrates an example of handling handle time windows where the speech-to-text transcription indicates an absence of voice activity despite the potential presence of speech in accordance with one or more embodiments;

FIG. 6 depicts an example approach for identifying and selecting specific time windows for un-transcribed voice activity analysis within a speech-to-text transcription in accordance with one or more embodiments;

FIG. 7 illustrates an example process of determining precise audio de-identification boundaries when sensitive text tokens are identified in the transcription in accordance with one or more embodiments;

DETAILED DESCRIPTION

In the following detailed description, for the purposes of explanation, numerous specific details are set forth to aid understanding of one or more embodiments of the present disclosure. In some instances, an embodiment of the present disclosure may be practiced without one or more of these specific details. In some cases, a described feature of one embodiment of the present disclosure is also a feature of one or more other embodiments of the present disclosure even though the feature is not expressly described with respect to one or more other embodiments. In some embodiments, well-known structures and devices are shown in the figures in block diagram form to avoid unnecessarily obscuring the embodiment.

1. GENERAL OVERVIEW
2. DE-IDENTIFYING SENSITIVE INFORMATION IN AUDIO CONVERSATIONS
3. AUDIO DE-IDENTIFICATION METHOD
4. EXAMPLE EMBODIMENT
5. PRACTICAL APPLICATIONS; ADVANTAGES; IMPROVEMENTS
6. EXAMPLE LLM ARCHITECTURE
7. COMPUTER NETWORKS AND CLOUD NETWORKS
8. HARDWARE OVERVIEW
9. MISCELLANEOUS; EXTENSIONS

1. GENERAL OVERVIEW

One or more embodiments include de-identifying sensitive information in audio conversations by combining un-transcribed voice activity detection (VAD) with large language model (LLM) analysis. After obtaining a timestamped speech-to-text transcription, the system identifies segments where automatic speech recognition (ASR) failed to transcribe spoken words. The system then sends the transcription to an LLM, with placeholders representing these un-transcribed time windows. By analyzing the textual context surrounding these placeholders, the LLM determines if sensitive information (such as PII or PHI) was likely spoken during these gaps. When sensitive content is identified, the system modifies the corresponding audio segments through methods like muting or inserting beeps, and stores the modified audio in non-transitory, computer-readable media. This approach addresses the technical challenge of incomplete de-identification in automated audio processing, which commonly occurs due to ASR failures caused by poor audio quality, diverse accents, or background noise. By leveraging LLM's contextual understanding to infer sensitive content in un-transcribed segments, the system provides more comprehensive protection of sensitive information compared to conventional ASR-only methods, ensuring better compliance with data protection regulations while handling diverse linguistic patterns and challenging audio conditions.

One or more embodiments described in this Specification and/or recited in the claims may not be included in the General Overview section.

2. DEIDENTIFYING SENSITIVE INFORMATION IN AUDIO CONVERSATIONS

Figure 1:
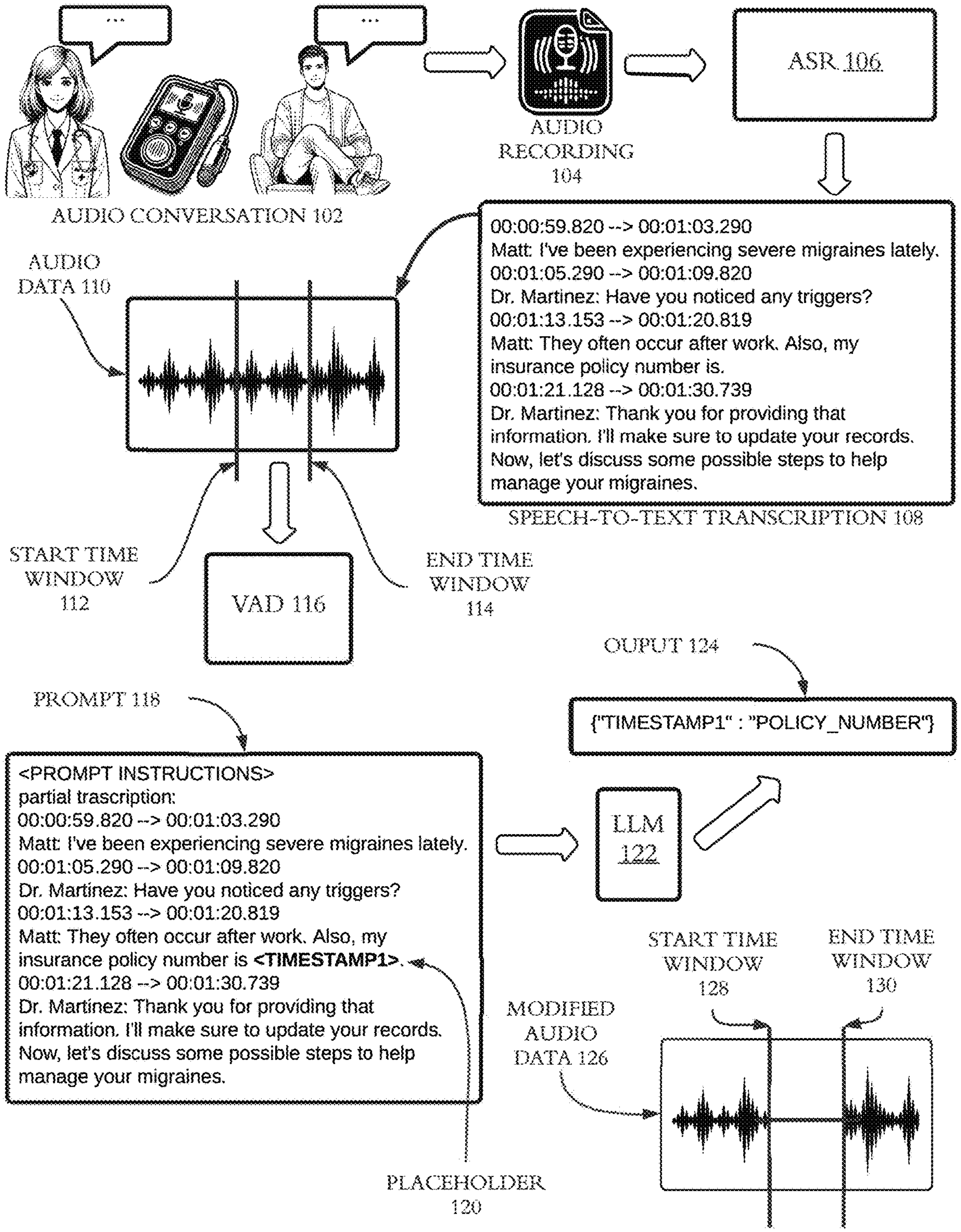
FIG. 1 illustrates deidentifying sensitive information in audio conversations in accordance with one or more embodiments.

FIG. 1 illustrates deidentifying sensitive information in audio conversations, focusing on handling un-transcribed speech segments. The system begins by acquiring text transcription data generated through automated speech recognition 106 of an audio conversation 102 that is recorded in an audio file 104. The transcription 108 includes text tokens paired with corresponding timestamps, enabling temporal alignment with the original audio. A VAD 116 analyzes a specific portion of the audio data 110 within a defined time window, bounded by a start time 112 and end time 114, to identify segments including un-transcribed speech. The system then constructs a prompt 118 for an LLM 122, incorporating the conversation's text transcription with a placeholder 120 representing the un-transcribed time window. The LLM processes this prompt and produces an output 124, leveraging the contextual information from transcribed text surrounding the placeholder to determine if sensitive information was likely spoken during the un-transcribed segment. Upon receiving confirmation from the LLM that sensitive content exists within the time window, the system applies de-identification measures to the corresponding audio segment to generate modified audio data 126. This modification occurs within temporal boundaries defined by a start time 128 and end time 130. The resulting modified audio data, with sensitive information appropriately obscured, is then stored in non-transitory, computer-readable media for secure retention.

The audio conversation 102 encompasses a digital audio recording 104 including human speech interactions between two or more participants. The recording exists as a sequence of digital audio samples captured at a defined sampling rate, such as 8 kHz to 48 KHz, and encoded using an audio format, such as WAV, MP3, or other audio codec. The audio conversation may include various acoustic characteristics including primary speech content, background noise, overlapping speech segments, and periods of silence. The speech content encompasses verbal communications that may include sensitive information, such as personally identifiable information (PII) or protected health information (PHI), that requires identification and subsequent de-identification. The audio data structure maintains temporal continuity throughout the conversation's duration, allowing for timestamp-based analysis and modification of specific segments within the recording.

The automated speech recognition (ASR) system 106 encompasses a computational framework that converts spoken language from the audio conversation into machine-readable text. In one or more embodiments, the ASR system employs a deep neural network architecture, including acoustic models and language models, to process audio input features and generate corresponding text output. The acoustic model analyzes spectral characteristics of the audio signal, such as mel-frequency cepstral coefficients (MFCCs) or filter bank energies, to identify phonetic units. The language model then applies statistical or neural approaches to map these phonetic units to words and phrases based on learned linguistic patterns and probabilities. The ASR system processes the audio stream in sequential segments, generating text tokens with associated confidence scores and temporal alignments indicated by timestamps. Due to various acoustic challenges, such as background noise, speaker accents, or overlapping speech, the ASR system may fail to transcribe certain spoken segments, resulting in gaps in the text transcription that benefit from additional analysis through VAD and LLM processing as disclosed herein.

The speech-to-text transcription 108 represents the textual output sequence generated by the automated speech recognition system from the audio conversation. The transcription encompasses discrete text tokens, where a token corresponds to a recognized word or linguistic unit with associated temporal metadata in the form of timestamps marking the start and end points in the audio. The transcription maintains sequential ordering that mirrors the temporal flow of the original conversation, preserving the linguistic structure and semantic relationships between recognized speech elements. The transcription may include gaps or omissions where the ASR system failed to confidently recognize spoken content, creating discontinuities in the text sequence while maintaining timestamp continuity. A transcribed token may include various attributes, such as confidence scores, speaker identification tags (if available), and precise temporal boundaries that enable alignment with the original audio data. In one or more embodiments, the transcription serves as the primary input for subsequent natural language processing (NLP) and analysis to identify potential locations of sensitive information through contextual examination by a large language model.

In one or more embodiments, the text transcription data employs a structured JSON format or the like (e.g., XML) to represent the speech-to-text transcription 108, organizing recognized speech elements as an array of token objects. A token object within the JSON structure includes three key-value pairs: a "word" field storing the transcribed text token, a "startTime" field indicating the temporal onset of the spoken word in the audio, and an "endTime" field marking the conclusion of the word's utterance. The timestamps follow a standardized time format (HH: MM: SS), enabling temporal alignment between the transcribed text and the source audio conversation. This JSON structure facilitates programmatic access and manipulation of the transcription data, allowing identification of time windows including potential gaps or un-transcribed segments. The sequential arrangement of token objects in the array preserves the chronological order of the conversation, while the explicit start and end timestamps for A word enable temporal windowing for subsequent VAD and de-identification operations. The structured format also supports parsing and analysis by the LLM when examining contextual relationships between transcribed words and potential sensitive content in un-transcribed segments.

The VAD system 116 processes audio data 110 through multiple signal processing stages to identify the presence of speech within a specified time window. The system first segments the audio data into short-time frames, such as 10-30 milliseconds in duration, with potential frame overlap to provide smooth analysis. For A frame, the VAD system extracts acoustic features, such as energy levels, zero-crossing rates, spectral entropy, or mel-frequency cepstral coefficients (MFCCs). These features undergo statistical analysis to distinguish speech components from background noise by comparing feature values against adaptive thresholds. The VAD system may employ machine learning models, such as neural networks or hidden Markov models, trained on labeled speech data to classify frames as including voice activity or silence. To improve robustness, the system may apply temporal smoothing across adjacent frames to eliminate spurious detections and account for speech continuity. The VAD system aggregates frame-level decisions across the entire time window, defined by start time 112 and end time 114, to determine if human speech is present. One or more embodiments additionally incorporate noise estimation and adaptation mechanisms to maintain accurate detection performance under varying acoustic conditions. The binary decision about voice activity presence in the time window enables the system to identify potentially un-transcribed speech segments that require further analysis by the large language model.

In one or more embodiments, the determination of the "target" time window's start time 112 and end time 114 involves analyzing temporal gaps between consecutive tokens in the transcription 108. One or more embodiments examine the timestamps of adjacent transcribed tokens to identify intervals that exceed inter-word pause durations in natural speech. For example, when the endTime of one token and the startTime of the subsequent token create a gap larger than a predetermined threshold (e.g., 300-500 milliseconds), this temporal discontinuity signals a potential un-transcribed speech segment. These identified gaps establish the target temporal boundaries for voice activity analysis, where the start time 112 corresponds to the endTime of the last successfully transcribed token before the gap, and the end time 114 aligns with the startTime of the first successfully transcribed token following the gap. One or more embodiments apply additional heuristics to refine these target boundaries such as extending the window by small margins (e.g., 50-100 milliseconds) to account for potential word boundary uncertainties in the ASR output. This timestamp-based window identification supports targeted analysis of audio segments where the ASR system potentially failed to transcribe spoken content, optimizing computational resources by focusing VAD on specific regions of interest in the audio data 110.

In one or more embodiments, a large language model (LLM) processes the transcription 108 to identify linguistic patterns and semantic structures that suggest missing content between transcribed tokens. The LLM analyzes the grammatical flow, syntactic relationships, and semantic coherence between adjacent tokens to detect unnatural breaks or incomplete linguistic constructs. For example, when encountering sequences like "Please call" followed by "at 3 PM," the LLM recognizes a missing object of the verb "call" and flags the temporal gap between these phrases as potentially including un-transcribed speech. The LLM may employ attention mechanisms to weigh the importance of surrounding context and identify discourse markers, incomplete phrases, or broken referential relationships that indicate missing content. Upon identifying such linguistic discontinuities, the LLM outputs the temporal boundaries defined by the timestamps of tokens surrounding the suspected gaps. One or more embodiments then extract these timestamp pairs to establish time windows for subsequent VAD, where A window's start time 112 and end time 114 correspond to the temporal boundaries of the identified linguistic gaps. This LLM-based approach can be used in addition to, or as an alternative to, gap detection methods by incorporating semantic understanding to identify potential transcription failures even when temporal gaps between tokens appear normal.

A time window of audio data 110 comprises a temporally bounded segment of digital audio samples extracted from the audio conversation 102. The time window spans a continuous interval defined by a start time 112 and end time 114, where these temporal boundaries align with specific sample indices in the digital audio stream. The windowed audio segment may maintain the original sampling rate and bit depth of the source recording, including the raw acoustic information within the specified temporal bounds. The window length may range from hundreds of milliseconds to several seconds, depending on the duration of suspected un-transcribed speech segments identified through transcription analysis. An audio sample within the window represents the amplitude of the acoustic signal at discrete time points, preserving spectral content and acoustic features present in the original recording during the specified interval. The time window provides a focused subset of the audio data for targeted analysis by the VAD system 116, enabling efficient processing of specific conversation segments where the automated speech recognition system may have failed to generate accurate transcriptions.

Un-transcribed voice activity encompasses acoustic segments including human speech that lack corresponding accurate textual representations in the transcription 108, occurring through two primary mechanisms. The first mechanism involves complete transcription gaps where the ASR system failed to generate any text tokens for detected speech, resulting in temporal discontinuities between adjacent transcribed tokens. The second mechanism involves explicit ASR system annotations within the transcription that indicate detected but un-transcribable speech, such as JSON tokens including descriptive labels like "inaudible_speech", "muted_audio", or "low_volume_speech" along with corresponding timestamps. These annotations may include confidence scores or other metadata indicating the ASR system's detection of speech-like acoustic patterns despite inability to convert the speech to text. Both mechanisms represent scenarios where human speech may be present in the audio data but lacks accurate textual representation, either through complete omission or explicit marking of transcription failure. The VAD system 116 may process these segments to confirm the presence of speech characteristics, regardless of the origin of the un-transcribed status, either complete ASR failure or explicit indication of transcription problems.

Upon confirmation of voice activity by the VAD system 116 within a specific time window, one or more embodiments construct a prompt 118 by processing the transcription 108 to insert a placeholder 120 at the temporal position corresponding to the detected un-transcribed speech. The placeholder insertion process first identifies the appropriate location in the transcription by matching the time window's start time 112 and end time 114 with the timestamps of surrounding transcribed tokens. A standardized placeholder token, such as "[UNTRANSCRIBED_SPEECH]" or "{GAP}", replaces any existing content or fills the gap between tokens at the identified temporal position. One or more embodiments then format the modified transcription into a prompt structure that includes sufficient context before and after the placeholder, incorporating several sentences or conversation turns to provide adequate semantic context for the LLM's analysis. The prompt may include explicit instructions directing the LLM to analyze the surrounding context for indicators of sensitive information potentially spoken during the un-transcribed segment. Additional metadata, such as the duration of the un-transcribed segment or confidence scores from the VAD, may supplement the prompt to aid the LLM's analysis of the temporal gap's content probability.

The placeholder 120 represents a textual marker within the transcribed conversation that denotes a temporal segment where voice activity was detected but not successfully transcribed by the ASR system. The placeholder serves as a structural annotation indicating the position and duration of un-transcribed speech, maintaining the sequential integrity of the conversation's textual representation. This marker functions as a spatial and temporal reference point for the LLM to analyze surrounding contextual information. The placeholder explicitly demarcates gaps in the transcription that correspond to specific time windows in the original audio data, enabling the LLM to perform targeted analysis of the surrounding transcribed text to infer potential sensitive content. By incorporating precise temporal boundaries, the placeholder facilitates accurate mapping between identified sensitive content and the corresponding audio segments requiring de-identification.

The placeholder 120 in one or more embodiments is a structured tag including a unique temporal identifier corresponding to the un-transcribed time window in the audio data. The tag follows a standardized format, such as "<GAP_1234567890>", where the numerical component represents a timestamp of the un-transcribed segment. When generating the prompt 118, one or more embodiments embed these uniquely identifiable placeholders within the transcribed text, maintaining temporal alignment with the audio conversation 102. The LLM 122 processes this enriched prompt and generates an output 124 that explicitly references the placeholder's unique identifier when indicating the presence of sensitive content. For example, the LLM output may specify "GAP_1234567890 includes sensitive medical information based on the surrounding discussion of patient symptoms." This structured approach enables unambiguous mapping between the LLM's sensitivity determinations and specific temporal segments in the audio data 110. One or more embodiments then use these referenced identifiers to accurately locate and apply de-identification tactics to the corresponding audio segments, targeting sensitive content within the modified audio data 126.

While temporal identifiers provide one implementation approach for the placeholder 120, one or more embodiments support multiple formats for unique identification of un-transcribed segments. The placeholder tag structure remains flexible, accommodating various identifier schemas, such as sequential numbering ("<GAP_001>"), UUID-based identification ("<GAP_550c8400-c29b-41d4-a716-446655440000>"), or hash-based references ("<GAP_b5d4cc23a>"). A placeholder format maintains uniqueness within at least the context of a single audio conversation 102 to ensure unambiguous reference resolution in the LLM output 124. One or more embodiments map these non-temporal identifiers to the corresponding time windows in the audio data 110 through an internal reference table, preserving the ability to locate and modify specific audio segments. This identification approach enables one or more embodiments to select identifier formats that best align with existing architecture requirements, data storage constraints, or integration needs. The placeholder's function of marking un-transcribed segments for LLM analysis remains consistent regardless of the chosen identification scheme, maintaining the ability to effectively detect and protect sensitive information in the audio conversation.

The large language model (LLM) 122 functions as a neural network-based system trained on extensive text corpora to understand and analyze natural language patterns within the context of audio conversation transcripts. The LLM processes input prompts including transcribed text segments interspersed with placeholders representing un-transcribed voice activity. Through analysis of the semantic relationships and contextual cues in the surrounding transcribed text, the LLM determines if sensitive information was likely spoken during the un-transcribed time windows. The LLM leverages deep learning architectures, such as transformer-based models, to capture long-range dependencies and contextual relationships within the text. When processing the prompt 118, the LLM examines both preceding and following text segments relative to A placeholder 120, applying learned patterns to identify linguistic indicators suggesting the presence of sensitive entities, such as personal identifiers, medical information, or confidential data. The LLM generates structured outputs 124 that explicitly associate sensitivity determinations with specific placeholders, enabling precise targeting of audio segments requiring de-identification. This contextual analysis capability allows the system to identify potential sensitive content even when the exact words are not available in the transcription, enhancing the robustness of the audio de-identification process.

The output 124 represents a structured response generated by the LLM 122, indicating the presence or absence of sensitive entities within un-transcribed segments of the audio conversation. The output includes explicit references to specific placeholders and provides detailed sensitivity determinations based on contextual analysis of surrounding text. A sensitivity determination in the output includes multiple components: a reference to the unique identifier from the corresponding placeholder 120, a classification of the type of sensitive entity detected (such as personally identifiable information, protected health information, or other confidential data), and a confidence score associated with the determination. The output may also include additional metadata, such as the specific category of sensitive information (e.g., "medical diagnosis," "social security number," or "financial account details") inferred from the contextual analysis. This structured format enables downstream processing systems to make informed decisions about applying appropriate de-identification tactics to the corresponding audio segments. The output links between the LLM's contextual analysis and the subsequent audio modification process, ensuring precise targeting of sensitive content within the time windows identified by the VAD system.

In one or more embodiments, the prompt 118 incorporates explicit instructions that enumerate specific sensitive entity types for the LLM 122 to detect, such as "NAME," "ADDRESS," "PHONE_NUMBER," "SSN," "DOB," or "MEDICAL_CONDITION."

These predefined entity types constrain the LLM's analysis scope and ensure consistent categorization of sensitive content. When analyzing the context surrounding A placeholder 120, the LLM 122 evaluates if the un-transcribed speech segment likely includes one of these enumerated sensitive entity types. The output 124 follows a structured format where A placeholder reference maps to either a specific sensitive entity type from the predefined set or a "NONE" designation. For example, given three placeholders in the prompt, the output might indicate "<GAP_001>: NAME, <GAP_002>: NONE, <GAP_003>: MEDICAL_CONDITION," reflecting the LLM's determination for an un-transcribed segment. This standardized entity typing system enables downstream processing to apply entity-specific de-identification tactics, for instance, using different audio modification techniques for medical information versus personal identifiers. The predefined entity types also facilitate systematic tracking and auditing of sensitive content detection across multiple audio conversations.

In one or more embodiments, the prompt 118 provides the LLM 122 with a comprehensive taxonomy of sensitive entity types along with contextual detection guidelines for a category. The taxonomy begins with PERSON entities, instructing the LLM to analyze conversational patterns indicative of personal names, particularly in greeting contexts or personal references. Demographic identifiers are segmented into specific categories; AGE captures both explicit birth dates and age-related discussions, while ADDRESS and LOCATION differentiate between specific residential information and general geographical references. The taxonomy includes relationship-based categories, where PARENTHOOD and MARITAL_STATUS guide the LLM to identify discussions revealing family structure or relationship status. Professional identification is handled through the OCCUPATION category, focusing on job-related discussions and employment details. Contact information is captured under the TELEPHONE category, with specific attention to numerical sequences or discussions about contact methods. A NON_PHI designation serves as a catch-all classification for segments conclusively determined to include no sensitive information based on surrounding context. An entity type in the prompt includes specific detection heuristics, enabling the LLM to generate precise output 124 that maps a placeholder 120 to the most appropriate category based on contextual analysis of adjacent transcribed text. This structured categorization system enables fine-grained control over subsequent de-identification strategies, where different sensitive entity types may require different audio modification approaches in the modified audio data 126.

In one or more embodiments, the output 124 employs a JSON-structured or like (e.g., XML) format to encode the LLM's 122 sensitivity determinations for a placeholder in a machine-readable and hierarchical manner. The JSON structure includes an array of objects, where an object corresponds to a specific placeholder 120 and includes fields for the placeholder's unique identifier, the detected sensitive entity type, and any additional metadata about the detection. For example, a single placeholder analysis might be represented as {"placeholder_id": "GAP_001", "entity_type": "PERSON", "confidence_score": 0.95, "context_indicators": ["greeting_pattern", "formal_title"]}. The structured format allows for consistent parsing and processing of the LLM's determinations, enabling automated workflow systems to efficiently route different types of sensitive content through appropriate de-identification pipelines. Multiple placeholder analyses are grouped within the JSON structure, creating a comprehensive sensitivity map of the audio conversation. The JSON format also supports nested structures for complex sensitivity patterns, such as when multiple entity types might be present in a single un-transcribed segment, represented as arrays of potential classifications with associated confidence scores. This machine-readable output structure facilitates integration with downstream processing systems and enables automated auditing of sensitivity detection patterns across multiple audio conversations.

The modified audio data 126 encompasses processed audio content where potentially sensitive speech has been audibly altered within a specific temporal segment. This segment spans from start time 128 to end time 130, corresponding to the temporal bounds where the LLM 122 identified likely sensitive content based on analysis of the placeholder 120. The modified time window includes transformed audio signals that obscure or remove the original speech content while maintaining the overall temporal structure of the conversation. The de-identification process applies signal processing techniques to this precise window, ensuring that modifications are restricted to the potentially sensitive portions while preserving surrounding audio context. Start time 128 marks the initial point at which audio modification begins, coinciding with the detected onset of suspected sensitive speech, while end time 130 designates the temporal conclusion of the modification period. The temporal boundaries of the modified segment align with the original time window where un-transcribed voice activity was detected, ensuring complete coverage of potentially sensitive content identified through LLM analysis.

Several signal processing techniques can be employed to de-identify sensitive speech content within the specified time window of the audio data. One approach involves amplitude reduction through selective muting, where the signal amplitude is attenuated to zero or near-zero levels throughout the sensitive temporal segment. Another method introduces masking tones-such as brief, high-frequency beep signals at predetermined intervals—that effectively overlay and obscure the original speech content. Other approaches may employ band-pass filtering to selectively remove frequency components characteristic of human speech while maintaining ambient audio characteristics. Possible techniques include spectral replacement, where the speech frequencies are substituted with synthesized background noise matching the conversation's acoustic profile. Time-domain scrambling can also be applied, where small segments of the audio within the sensitive window are temporally reordered to render the speech unintelligible while maintaining overall energy levels. Possible implementations leverage pitch shifting to modify vocal frequencies beyond natural ranges, making the speech content unrecognizable while preserving the presence of voice activity. These de-identification tactics can be applied individually or combined in layered approaches depending on the required level of privacy protection and audio quality preservation.

In one or more embodiments, the temporal boundaries 128 and 130 of the modified segment are determined through analysis of both the placeholder 120 characteristics and surrounding contextual markers in the audio data. One method involves temporal expansion, where the modification window extends slightly beyond the placeholder boundaries to account for co-articulation effects and ensures complete coverage of potentially sensitive speech content. Natural language processing techniques can analyze the grammatical structure surrounding the placeholder 120 to identify likely word boundaries that then inform the precise positioning of start time 128 and end time 130. Acoustic feature analysis of the surrounding audio segments can be used to identify speech onset and offset points, allowing for refined boundary determination based on actual voice activity patterns. An implementation may employ prosodic analysis to detect natural speech pauses or intonation changes that demarcate sensitive information, using these acoustic cues to optimize the modification window placement. Dynamic time warping techniques can be used to align the placeholder duration with temporal patterns of similar sensitive entities, providing a data-driven approach to boundary determination. One or more embodiments may also incorporate confidence scores from the VAD to adjust boundary positions, expanding the modification window in cases of uncertain VAD.

In one or more embodiments, the temporal boundaries 128 and 130 of the modified segment can be derived through direct mapping or adaptive adjustment of the VAD system's identified time window 112 and 114. One approach implements direct temporal correspondence, where start time 128 and end time 130 of the modified segment precisely match the VAD-detected boundaries of start time 112 and end time 114. Another method employs buffer zones by extending the modification window slightly beyond the VAD-detected boundaries to ensure complete coverage of speech transitions. One or more embodiments may analyze acoustic features within a predetermined margin around the VAD boundaries (112, 114) to refine the modification window based on speech energy thresholds or spectral characteristics. One or more embodiments utilize zero-crossing rate analysis near the VAD boundaries to identify more precise word boundaries within the detected voice activity segment. Adaptive boundary adjustment can be applied based on the confidence scores output by the VAD system 116, where higher confidence scores result in tighter temporal alignment between the VAD boundaries and modification boundaries, while lower confidence triggers expanded modification windows. The temporal mapping may also incorporate speech rate estimation to dynamically adjust the modification window proportional to the detected speech tempo within the VAD-identified segment.

In one or more embodiments, the temporal boundaries of the modified segment can be determined through analysis and adjustment of the timestamps within the speech-to-text transcription 108. One approach examines timestamps of transcribed words immediately preceding and following the un-transcribed segment, establishing these as initial anchors for the modification window boundaries. Temporal interpolation techniques may be used to estimate appropriate boundary positions by analyzing the average word duration and spacing patterns evident in the timestamp sequence of the transcription 108. One or more embodiments leverage word-level confidence scores from the transcription process, extending the modification boundaries when adjacent transcribed words have lower confidence scores that suggest potential boundary uncertainty. One or more embodiments employ statistical models trained on word spacing patterns to predict likely word boundaries within un-transcribed segments based on the temporal rhythm established by surrounding timestamp sequences. One or more embodiments analyze the syntactic structure revealed by the transcription timestamps to identify natural phrase boundaries that inform optimal placement of the modification window. The boundary determination process may also incorporate speaker-rate analysis derived from the timestamp patterns in the transcription 108, adjusting the modification window proportionally to account for variations in speech tempo throughout the conversation.

The modified audio data 126 enables privacy-preserving downstream analytics through multiple technical approaches that maintain utility while protecting sensitive content. Feature extraction processes can safely compute acoustic characteristics, speaker patterns, and conversational dynamics from the modified audio data 126 since sensitive segments have been irreversibly altered. Machine learning models can be trained on the temporal patterns and non-sensitive speech content while automatically excluding the deidentified segments through attention masking or specialized loss functions. Statistical analysis of conversation flow remains viable by treating deidentified segments as censored observations in time series analysis. Natural language processing tasks can leverage the surrounding context of modified segments while treating de-identified portions as structured missing data. One or more embodiments generate synthetic replacement audio for de-identified segments that preserve statistical properties of the original conversation while including no sensitive information. The modified audio data 126 in one or more embodiments supports speaker diarization by maintaining speaker-specific acoustic features in non-sensitive segments while anonymizing speaker identity in sensitive portions. Quality assurance processes can evaluate conversation characteristics and compliance metrics by analyzing the presence and distribution of de-identified segments without accessing the original sensitive content. Machine learning architectures may incorporate differential privacy guarantees when training on the modified audio, adding calibrated noise to extracted features to prevent any potential reconstruction of sensitive patterns.

In one or more embodiments, a multi-tenant cloud provider network implements audio de-identification techniques disclosed herein as a scalable service through secure architectural components and isolation mechanisms. The service architecture may deploy independent processing instances within dedicated virtual private clouds (VPCs) for a customer tenant, ensuring strict isolation of customer audio data during processing. Load balancers may distribute incoming audio processing requests across multiple availability zones while maintaining tenant boundaries. A customer's audio de-identification workflow may execute within containerized environments with separate resource allocations and encryption keys. The service may implement role-based access control (RBAC) with fine-grained permissions specific to a tenant's requirements and compliance needs. Tenant-specific configurations may allow customization of de-identification tactics, sensitivity thresholds, and LLM prompting strategies through secure APIs. The multi-tenant service may maintain separate queuing systems for a customer's audio processing jobs, preventing cross-tenant interference in processing priorities. Monitoring and logging systems may track service performance and security metrics while maintaining strict separation of tenant-specific operational data. The service architecture may scale horizontally through auto-scaling groups that spawn additional processing capacity within tenant-specific boundaries based on demand. Integration with the provider network's identity and access management (IAM) services may enable seamless but secure access to the de-identification capabilities through customer-specific authentication tokens. The service may implement tenant-aware cost allocation and usage monitoring to enable precise billing based on processing time and storage consumption.

Figure 2:
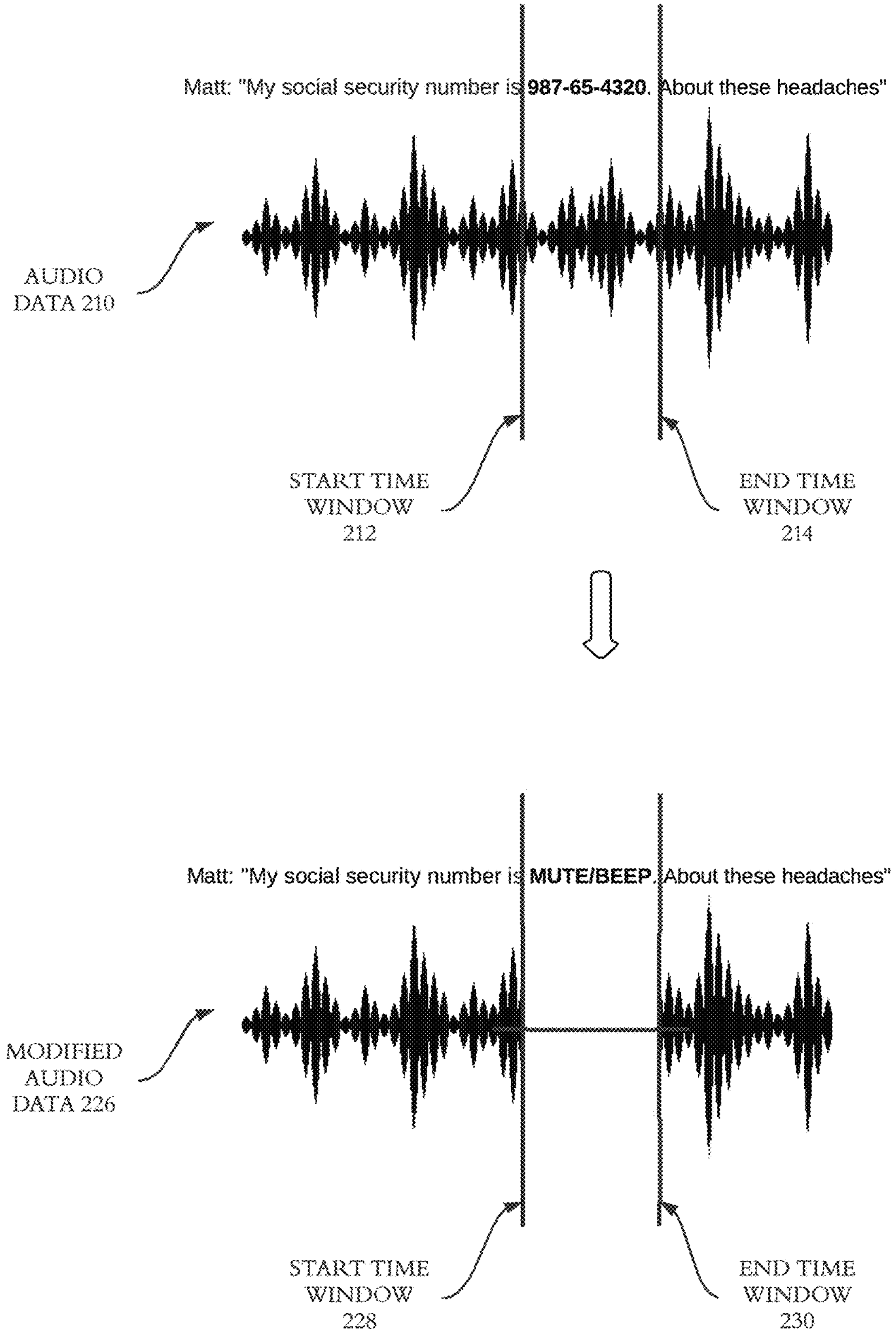
FIG. 2 illustrates an example waveform representation of audio data including speech that requires de-identification in accordance with one or more embodiments.

FIG. 2 illustrates a waveform representation of audio data 210 including speech that requires de-identification. Within this audio data, a specific time window bounded by a start time 212 and end time 214 includes un-transcribed voice activity detected by a VAD system. FIG. 2 demonstrates how one or more embodiments process this time window after an LLM has determined that sensitive information exists within the window based on analyzing the surrounding transcribed text context. One or more embodiments generate modified audio data 226 by applying a de-identification tactic to a portion of the original audio data. This modified portion is defined by a start time 228 and end time 230; one of these times or both times may be adjusted from the original detection window to ensure complete coverage of the sensitive speech. In one or more embodiments, the de-identification tactic involves either muting the audio or inserting audible beep sounds during playback to mask the sensitive entity. These audio modifications persist in the modified audio data 226 when stored in non-transitory, computer-readable media, ensuring that sensitive information remains protected during subsequent audio playback.

Figure 3:
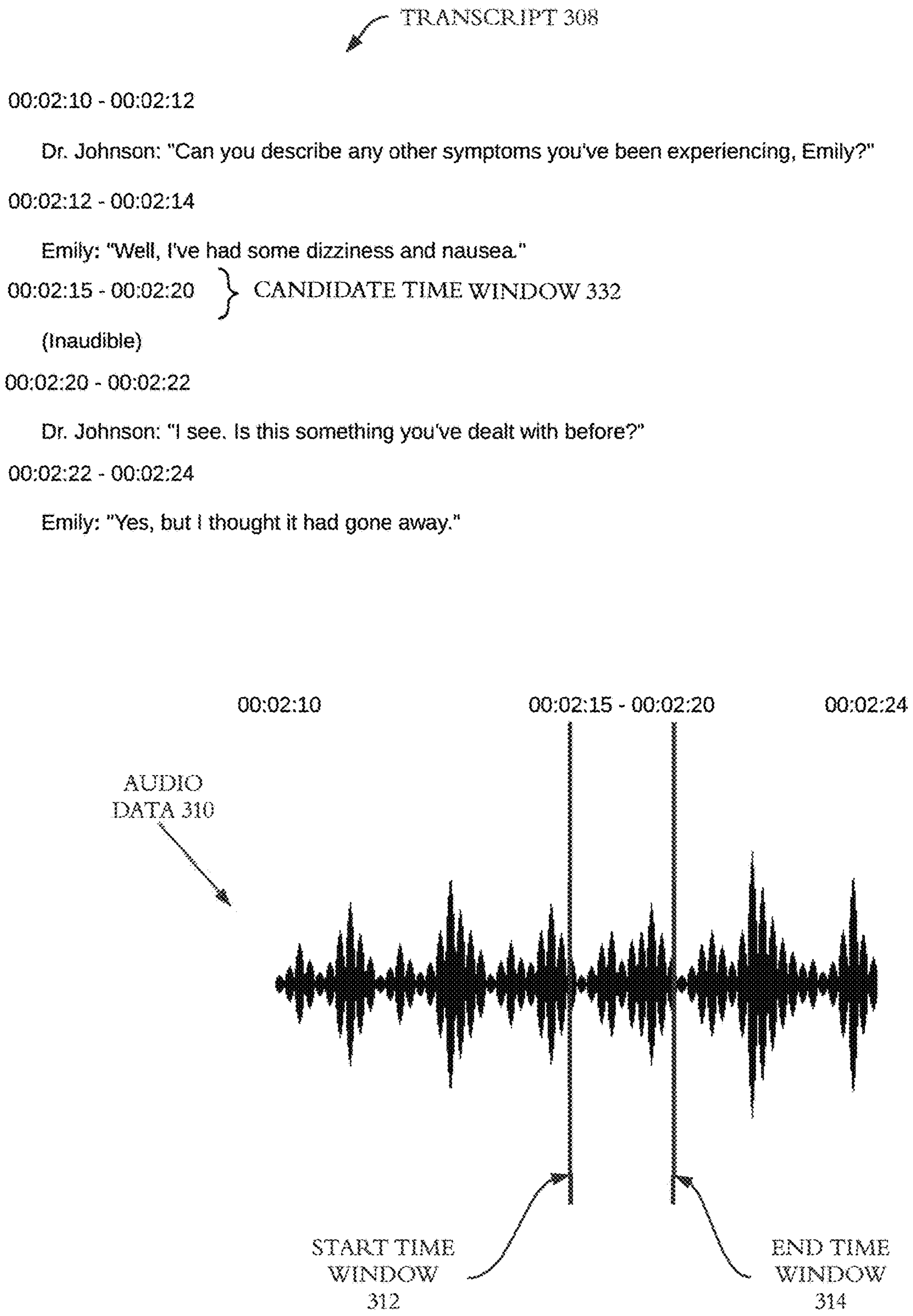
FIG. 3 depicts example audio data aligned with a corresponding speech-to-text transcription generated by an automated speech recognition system in accordance with one or more embodiments.

FIG. 3 depicts audio data 310 aligned with a corresponding speech-to-text transcription 308 generated by an ASR system. FIG. 3 shows how one or more embodiments identify a candidate time window 332 within the text transcription data, where timestamps associated with the transcribed text tokens guide the selection of this window. Based on these timestamps, one or more embodiments determine a corresponding analysis window in the audio data, bounded by a start time 312 and an end time 314, where the VAD system searches for un-transcribed speech. This temporal mapping between the text transcription and audio data enables targeting of audio segments that require analysis for potential missed speech.

The candidate time window 332 can be determined through several technical approaches that analyze patterns and anomalies in the text transcription data. One possible method examines the temporal spacing between consecutive text tokens' timestamps, flagging intervals that exceed inter-token gaps for natural speech. These anomalous gaps often indicate potential un-transcribed speech segments. Another possible approach involves analyzing the linguistic structure of the transcribed text (e.g., using an LLM), where incomplete grammatical constructions or contextual discontinuities may signal missed speech content. One or more embodiments can also employ statistical models trained on the duration of various linguistic units (phonemes, words, phrases) to identify temporal regions where the observed token density deviates significantly from expected patterns. Natural language processing techniques can be applied to detect semantic discontinuities or missing logical connections in the transcribed text that may correspond to un-transcribed speech segments. Additionally, one or more embodiments may leverage prosodic features from the audio signal, such as sustained energy levels or fundamental frequency patterns, to cross-validate regions where speech activity exists but no corresponding transcription was generated. These methods can be combined using weighted scoring mechanisms to increase the reliability of candidate window identification, with the final window boundaries being adjusted based on confidence thresholds and minimum/maximum duration constraints for sensitive entities in spoken communication.

The candidate time window 332 can be determined by analyzing specific textual indicators within the speech-to-text transcription 308 that suggest failed or incomplete transcription(s). Automated speech recognition (ASR) systems may insert special tokens or placeholder text when encountering audio segments with uncertain transcription, using annotations like "[inaudible]," "[unclear]," or "[low volume]" in the output text. These transcription artifacts serve as markers for potential un-transcribed voice activity. One or more embodiments programmatically identify these markers within the text transcription and extract their associated timestamps to define the boundaries of candidate time window 332. Multiple consecutive or closely spaced markers might be merged into a single candidate window using configurable temporal thresholds. One or more embodiments may also consider the confidence scores provided by ASR systems for a transcribed token, where sequences of low-confidence tokens could indicate degraded audio quality and potential missed speech content. This marker-based approach provides a method for targeting audio segments that require additional analysis through VAD. The technique can be further refined by maintaining a customizable dictionary of ASR-specific transcription artifacts and their variations across different speech recognition platforms, ensuring comprehensive detection of problematic audio regions.

The candidate time window 332 can be determined by leveraging an LLM to analyze the semantic and syntactic patterns within the transcription 308. The LLM receives the transcribed text as input and processes the text using natural language understanding to identify potential gaps or inconsistencies in the narrative flow. When the LLM detects abrupt topic shifts, incomplete sentences, or missing logical connectors between statements, these anomalies may indicate un-transcribed speech segments. One or more embodiments can prompt the LLM with specific questions about the coherence of the text, such as "Identify locations in this text where information appears to be missing" or "Find segments where the conversation flow seems unnatural." The timestamps associated with the text tokens surrounding these LLM-identified discontinuities are then used to define the boundaries of candidate time window 332. This approach can be particularly effective for detecting missing sensitive information, as the LLM can recognize common patterns in how speakers reference or lead into discussions of personal details, medical information, or other protected content. One or more embodiments may employ multiple targeted prompts to the LLM, designed to identify different types of contextual discontinuities, with the results being aggregated and filtered based on confidence scores to determine the final candidate windows for voice activity analysis.

FIG. 4 illustrates how one or more embodiments use an LLM to analyze and classify sensitive information in un-transcribed audio segments. A speech-to-text transcription 408 includes transcribed text with associated timestamps. A prompt 418 is constructed and sent to the LLM, incorporating portions of the transcribed text along with a placeholder 420, that represents the time window where un-transcribed voice activity was detected. The placeholder serves as a contextual marker, enabling the LLM to analyze the surrounding text for clues about potential sensitive information. The LLM's output 424 specifically includes a classification of the sensitive entity type that was likely spoken during the un-transcribed time window. These entity types might include several categories, such as personal identifiable information (PII), protected health information (PHI), financial information, or other protected classes of sensitive data. The explicit identification of sensitive entity types in the LLM's output 424 enables one or more embodiments to apply appropriate de-identification tactics based on the specific category of sensitive information detected. This typeaware approach allows for more nuanced handling of different kinds of sensitive information, potentially enabling varied de-identification strategies depending on the nature and sensitivity level of the detected content.

FIG. 5 illustrates how one or more embodiments handle time windows where the speech-to-text transcription 508 indicates an absence of voice activity despite the potential presence of speech. FIG. 5 demonstrates the process of analyzing the transcription data to identify temporal regions where the automated speech recognition system failed to detect or transcribe any speech. Upon identifying such a region, one or more embodiments deliberately insert a placeholder 520 into the prompt 518 that will be sent to the LLM. The placeholder 520 serves as a specific marker in the text sequence, representing the time window where the transcription data suggests silence or no voice activity. The prompt 518 incorporates this placeholder along with the surrounding transcribed text, enabling the LLM to analyze the contextual flow of conversation and determine if sensitive information might have been spoken during the apparently silent period. The strategic placement of the placeholder 520 within the prompt 518 ensures the LLM can leverage both preceding and following context to make informed determinations about potentially missed sensitive content.

FIG. 6 depicts a systematic approach for identifying and selecting specific time windows for un-transcribed voice activity analysis within a speech-to-text transcription 608. FIG. 6 shows multiple candidate time windows 632-1, 632-2, and 632-3 that have been identified as potential locations of un-transcribed speech. These candidate windows may represent various types of transcription anomalies or gaps in the conversation flow. From this set of candidate windows, the system selects a subset for detailed voice activity analysis, optimizing computational resources by focusing on the most promising intervals. The selection process might prioritize windows based on different factors, such as surrounding context, window duration, or confidence scores from the initial transcription process. The temporal distribution of candidate windows 632-1, 632-2, and 632-3 across the transcription timeline suggests that potential un-transcribed voice activity can occur at various points throughout the conversation. A selected window undergoes further analysis by the VAD system to confirm the presence of un-transcribed speech, followed by LLM analysis to determine if sensitive information was likely spoken during these periods. This multi-stage filtering approach enables efficient processing of audio conversations while maintaining thorough coverage of potentially sensitive content.

The selection of candidate time windows for VAD analysis can be accomplished through several technical approaches that prioritize windows based on specific criteria. One possible approach employs a scoring system that evaluates a candidate window using multiple weighted factors, such as the presence of contextual cues suggesting sensitive information, the duration of the potential un-transcribed segment, and the confidence scores of surrounding transcribed tokens. Windows with scores exceeding a configurable threshold are selected for further analysis. Another possible method leverages machine learning models trained on historical patterns of sensitive information disclosure in conversations, ranking windows based on the likelihood of including protected content. One or more embodiments may also employ acoustic feature analysis, prioritizing windows where audio characteristics (energy levels, spectral content, pitch variations) strongly indicate human speech despite the lack of transcription. Temporal proximity to known sensitive discussions can serve as another selection criterion, as sensitive information often clusters within specific portions of conversations. Resource optimization strategies may limit the number of selected windows based on available computational capacity while ensuring coverage of the highest-priority segments. The selection process can also incorporate domain-specific rules such as preferentially analyzing windows near temporal markers commonly associated with sensitive disclosures in particular industries or use cases.

In one or more embodiments, a duration-based filtering mechanism is used for selecting the candidate time windows that warrant analysis for un-transcribed voice activity. One or more embodiments first identify multiple candidate time windows (e.g., 632-1, 632-2, and 632-3) within the audio conversation where potential un-transcribed speech may exist. These windows are then filtered based on their respective time durations to determine the subset that should undergo detailed voice activity analysis. The duration-based filtering may eliminate windows that are too short to include meaningful speech or too long to likely represent a single missed utterance. This filtering strategy helps optimize computational resources by focusing analysis on time windows whose durations align with patterns of sensitive information disclosure in spoken communication. For example, windows lasting a few milliseconds might be filtered out as too brief for intelligible speech, while windows spanning several minutes might be subdivided or deprioritized. The filtered subset of windows represents temporal segments whose durations suggest a higher probability of including meaningful un-transcribed speech that could include sensitive information requiring protection. This temporal-length filtering approach provides an efficient mechanism for reducing the number of candidate windows that require resource-intensive VAD and subsequent LLM analysis.

In one or more embodiments, an LLM-driven filtering approach is used for selecting candidate time windows that warrant detailed analysis for un-transcribed voice activity. One or more embodiments begin by identifying multiple candidate time windows (e.g., 632-1, 632-2, and 632-3) within the audio conversation. For a candidate window, one or more embodiments create one or more prompts including the transcribed text surrounding that window. These prompts are sent to an LLM for analysis of the conversational context. The LLM evaluates the text transcriptions encompassing a candidate window to assess the likelihood of sensitive information being present in the un-transcribed segments. Based on the LLM's output, which might include confidence scores or probability assessments, one or more embodiments filter the initial set of candidate windows to identify a subset that merits more detailed voice activity analysis. This approach uses the LLM's natural language understanding capabilities to pre-screen candidate windows based on contextual patterns that suggest sensitive content. The filtering process helps optimize computational resources by prioritizing windows where the surrounding conversational context strongly indicates the potential presence of sensitive information requiring protection. This LLM-based filtering strategy provides an intelligent mechanism for reducing the number of windows that require resource-intensive VAD while maintaining high accuracy in identifying potentially sensitive content.

FIG. 7 illustrates the process of determining precise audio de-identification boundaries when sensitive text tokens are identified in the transcription. FIG. 7 shows a text token representing a credit card number "1234 5678 9012 3456"

that has been identified as sensitive content. Associated with this token are specific timestamps in the text transcription data, where "1234" begins at 0:12:50.34 and "3456" ends at 0:12:59.55. One or more embodiments extend these boundaries by applying a predetermined margin of error time amount (e.g., 1 second in this example) to ensure complete coverage of the sensitive information. This extension creates a wider de-identification range from 0:12:49.34 to 0:13:01.55, accounting for potential variations in speech rate or transcription alignment. The expanded time window compensates for possible imprecisions in the automated speech recognition system's timestamp assignments and ensures that sensitive information is fully protected even if spoken slightly before or after the detected timestamps. The margin of error provides a safety buffer that helps prevent incomplete de-identification due to temporal misalignment between the transcribed text and the actual audio content. This technically precise approach demonstrates how one or more embodiments combine token-level timestamp data with configurable safety margins to achieve reliable audio de-identification.

3. AUDIO DE-IDENTIFICATION METHOD

Figure 8:
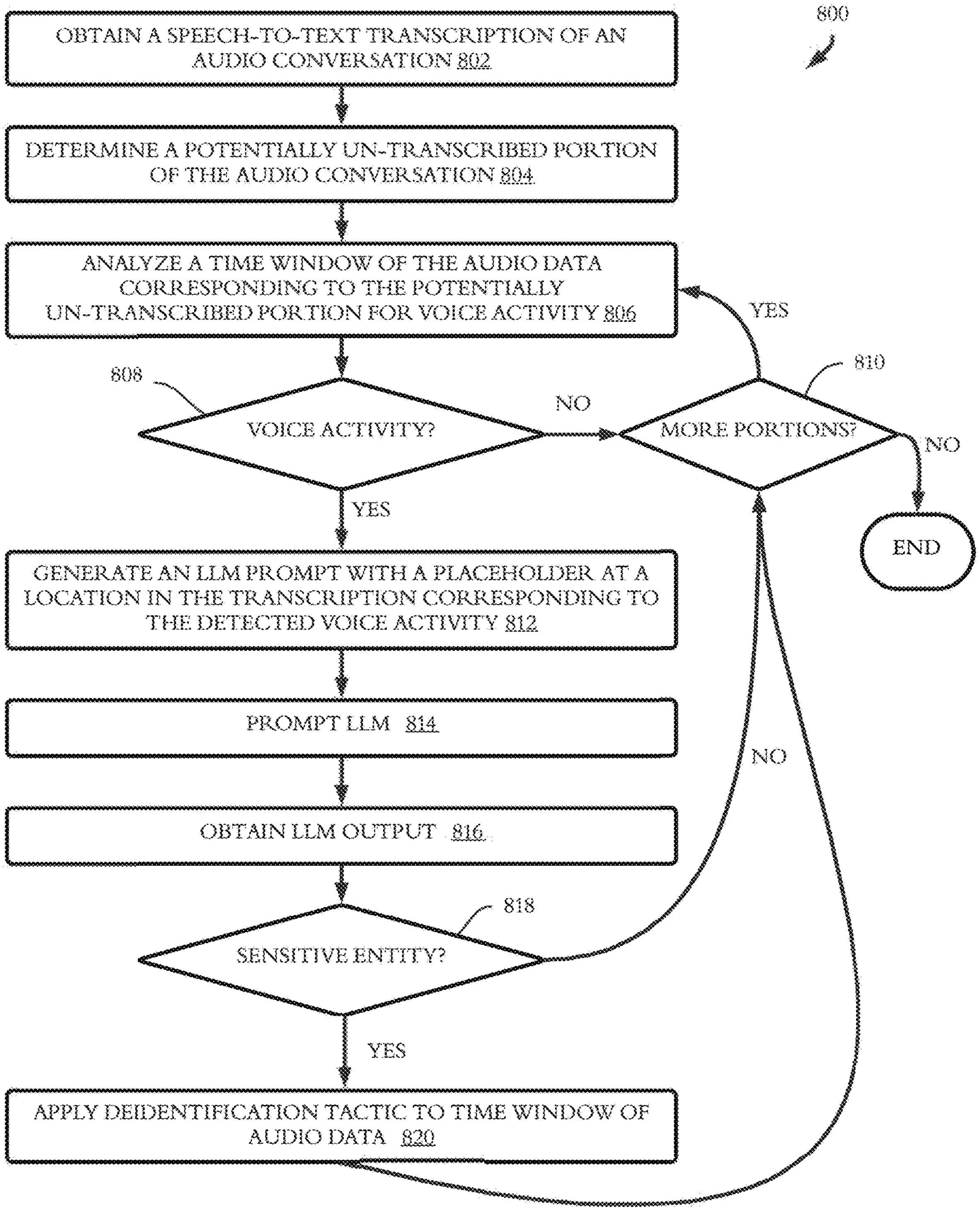
FIG. 8 illustrates a method for audio de-identification in accordance with one or more embodiments.

FIG. 8 illustrates a flowchart depicting a method 800 for de-identifying sensitive entities in audio conversations using a combination of VAD and LLM analysis. The method begins at operation 802, where an audio de-identification system obtains a speech-to-text transcription of an audio conversation. The system then proceeds to identify potentially un-transcribed portions of the audio conversation in operation 804. For an identified portion, the system analyzes a corresponding time window of the audio conversation at operation 806. At operation 808, the system performs VAD within the time window. When no voice activity is detected, the system proceeds to operation 810 to check for additional potentially un-transcribed portions requiring analysis. Upon detection of voice activity, the system advances to operation 812, where the system generates a prompt for an LLM, incorporating a placeholder at the location in the transcription corresponding to the detected voice activity. The system transmits the generated prompt to the LLM in operation 814 and receives the LLM's output in operation 816. At operation 818, the system evaluates the LLM's output to determine if a sensitive entity was likely spoken during the time window associated with the placeholder. When the LLM indicates the probable presence of a sensitive entity, the system implements a de-identification tactic to the corresponding time window of audio data at operation 820. The method then returns to operation 810 to evaluate if additional potentially un-transcribed portions require analysis. The process continues until all potentially un-transcribed portions have been analyzed or other suitable termination condition is met, at which point the method terminates.

At operation 802, an audio de-identification system acquires a speech-to-text transcription of an audio conversation. The speech-to-text transcription represents the output of an automatic speech recognition (ASR) system that has processed the audio conversation to convert spoken words into corresponding text. The transcription comprises a sequence of text tokens, where a text token corresponds to a recognized word or utterance from the audio conversation. Additionally, a text token or sets of text tokens in the transcription is associated with temporal metadata, specifically timestamps that indicate when the corresponding word or utterance occurred within the audio conversation. This temporal alignment between the text tokens and the original audio enables precise mapping between transcribed content and specific segments of the audio data.

At operation 804, the audio de-identification system performs analysis to determine potentially un-transcribed portions of the audio conversation. The system examines the temporal sequence of the transcribed text tokens to identify gaps or discontinuities in the transcription timeline. These gaps represent time intervals where the ASR system may have failed to generate text tokens, despite the potential presence of speech. The determination process leverages the timestamp metadata associated with a transcribed text token to detect temporal regions between consecutive tokens that exceed an expected inter-token duration threshold. Such extended gaps between transcribed tokens often indicate segments where the ASR system encountered difficulties in recognition, possibly due to factors, such as poor audio quality, background noise, varied accents, or rapid speech patterns. The identified potentially un-transcribed portions are marked with their corresponding start and end timestamps for subsequent analysis.

At operation 806, the audio de-identification system conducts a focused analysis of a time window corresponding to a potentially un-transcribed portion of the audio conversation identified in operation 804. The system isolates a segment of the audio data using the start and end timestamps associated with the potentially un-transcribed portion. This temporal windowing operation extracts a discrete section of the audio signal for detailed examination. The time window encompasses the exact duration of the potentially un-transcribed portion and may include small temporal buffers before and after the gap to ensure complete capture of any speech activity that might span the boundaries of the identified portion. The system processes this windowed audio segment to prepare for subsequent VAD, applying any necessary audio preprocessing operations, such as normalization or filtering, to optimize the signal for analysis.

At operation 808, the audio de-identification system performs VAD analysis on the time window isolated in operation 806. The VAD analysis processes the audio signal within the specified time window to determine if human speech is present. This detection involves analyzing various acoustic features of the audio signal, such as energy levels, spectral content, zero-crossing rates, or other speech-indicative characteristics. The system applies signal processing algorithms to distinguish speech from background noise, silence, or non-speech sounds within the windowed segment. The outcome of this analysis is a binary determination; either voice activity is detected within the time window, or no voice activity is present. When voice activity is detected, the process advances to operation 812 for further analysis using an LLM. Conversely, if no voice activity is detected, the system proceeds to operation 810 to check for additional potentially un-transcribed portions.

At operation 810, the audio de-identification system performs a decision operation to determine if additional potentially un-transcribed portions of the audio conversation require analysis. The system references an internal tracking mechanism that maintains the status of potentially un-transcribed portions identified in operation 804. This tracking mechanism compares the set of analyzed portions against the complete set of identified portions to determine if any remain unprocessed. When unprocessed portions exist, the method returns to operation 806 to analyze the next time window in the sequence. Conversely, when potentially un-transcribed portions have been processed through the VAD, and where applicable, the LLM analysis pipeline, the method terminates. This decision operation ensures comprehensive coverage of identified gaps in the transcription while preventing redundant analysis of previously processed segments.

At operation 812, the audio de-identification system constructs a prompt for submission to an LLM based on the detection of voice activity in the analyzed time window. The system generates this prompt by incorporating the speech-to-text transcription with a specially formatted placeholder inserted at the temporal location corresponding to the detected voice activity. The placeholder serves as a marker within the transcription to indicate the position of the un-transcribed speech segment. The system includes contextual information in the prompt by incorporating transcribed text from both before and after the time window including the detected voice activity. This surrounding context provides the LLM with necessary linguistic and semantic information to make informed predictions about the content of the un-transcribed segment. The generated prompt may also include specific instructions or queries directing the LLM to assess if sensitive information, such as personally identifiable information (PII) or protected health information (PHI), was likely spoken during the marked time window.

At operation 814, the audio de-identification system transmits the generated prompt to the LLM for analysis. The system establishes a communication channel with the LLM that may be hosted locally or accessed through a remote API endpoint. The transmission process involves sending the formatted prompt, including the transcription with the inserted placeholder and surrounding context, to the LLM's input interface. The system ensures proper encoding and formatting of the prompt according to the LLM's required input specifications. Any necessary authentication tokens, API keys, or other security credentials are included with the transmission to authorize access to the LLM service. The system may also specify additional parameters for the LLM analysis, such as temperature settings, response format requirements, or other model-specific configuration options.

At operation 816, the audio de-identification system receives and processes the output generated by the LLM based on the submitted prompt. The system captures the LLM's response through the established communication channel, ensuring complete reception of output data. The received output may include multiple components, such as the LLM's analysis results, confidence scores, or specific annotations regarding potential sensitive entities. The system performs necessary post-processing on the received output, which may involve parsing structured response formats, extracting relevant predictions, or converting the output into a standardized internal format. Error handling mechanisms ensure robust processing of the LLM's response, accounting for potential communication failures, timeout conditions, or malformed responses. The processed output includes the LLM's assessment of if sensitive information was likely spoken during the un-transcribed time window, based on the contextual analysis of surrounding transcribed speech.

At operation 818, the audio de-identification system evaluates the processed LLM output to determine if a sensitive entity was likely spoken during the time window corresponding to the placeholder. The system analyzes the LLM's predictions and confidence scores regarding the presence of PII, PHI, or other categories of sensitive information in the un-transcribed segment. This evaluation may involve comparing confidence scores against predetermined thresholds or applying additional rule-based criteria to the LLM's assessment. When the evaluation indicates a high likelihood of sensitive entity presence, the system directs the process flow to operation 820 for audio de-identification. Conversely, if the evaluation suggests no sensitive entities were spoken, the system proceeds to operation 810 to check for additional un-transcribed portions requiring analysis. The determination logic may incorporate multiple factors beyond simple binary classification, such as the type of predicted sensitive entity, the confidence level of the prediction, or the sensitivity level of the predicted content.

At operation 820, the audio de-identification system applies a de-identification tactic to the specific time window of audio data including the detected sensitive entity. The system accesses the original audio data using the temporal boundaries defined by the analyzed time window. A selected de-identification technique is then applied to modify the audio content within these boundaries. Common de-identification tactics may include audio muting, insertion of masking tones such as beeps, application of audio filtering, or replacement with synthetic speech including non-sensitive placeholder content. The selection of the specific de-identification tactic may depend on various factors, such as the type of sensitive entity detected, regulatory requirements, or predetermined configuration settings. The system ensures precisc temporal alignment of the de-identification modification with the identified sensitive speech segment to maintain the intelligibility of surrounding non-sensitive audio content. After applying the de-identification tactic, the system proceeds to operation 810 to evaluate if additional potentially un-transcribed portions require analysis.

In one or more embodiments, an agent system or agent process can be implemented to orchestrate the interaction workflow between the audio processing pipeline and the LLM for sensitive content detection in un-transcribed segments. The agent functions as an intermediary controller that manages the preparation, transmission, and handling of prompts and responses to/from the LLM API endpoint. Specifically, the agent constructs appropriately formatted prompts by combining the timestamped transcription data with metadata about un-transcribed segments, including their temporal boundaries and placeholder representations. The agent then handles the asynchronous communication with the LLM service, managing authentication, rate limiting, retry logic, and error handling during prompt submission. Upon receiving the LLM's output analysis identifying likely sensitive content within the context windows surrounding un-transcribed segments, the agent processes this structured response and maps the sensitivity determinations back to the corresponding temporal segments in the audio timeline. The agent then triggers the appropriate audio modification operations (e.g., muting, beeping) for segments flagged as sensitive, coordinating with the audio processing subsystem. Throughout this workflow, the agent maintains state information about the processing status of different segments and ensures proper synchronization between the text analysis and audio modification phases. This agent-based architecture provides a modular, maintainable approach to integrating LLM capabilities into the audio de-identification pipeline while abstracting away the complexity of LLM interaction patterns from other system components.

In one or more embodiments, a prompt transmission to and output reception from a LLM may involve a multi-layered system architecture facilitating bidirectional communication. The process initiates when a prompt is received by an agent system, which functions as an intermediary interface layer between a client that sends the prompt and the core LLM. This agent system preprocesses the incoming prompt through several potential steps: tokenization of the raw text input, application of any relevant system prompts or context windows, and formatting of the payload according to the LLM's expected input schema. The formatted prompt is then transmitted to the LLM's inference endpoint, via API calls over secure network protocols. The LLM processes the input through its transformer (or other suitable) architecture and generates a response, which is returned to the agent system. The agent system then post-processes this output-potentially filtering, formatting, or additional context-before delivering it back to the client. Throughout this process, the agent system may maintain state information about the conversation, manage authentication and rate limiting, log interactions, and handle error conditions. The agent can also implement various control mechanisms such as prompt injection protections, output moderation, and response validation. This architectural pattern allows for sophisticated interaction patterns while abstracting the complexity of direct LLM communication from clients.

4. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

The following is an example of a prompt template used in one or more embodiments to generate a prompt of an LLM to determine if there are un-transcribed sensitive entities in an audio conversation (e.g., prompt 118 of FIG. 1). The line numbers are for purposes of providing a clear example in this disclosure and are not necessarily part of the template itself.

00: You are given a partial transcription of an audio recording where some sections are missing. Each section is timestamped. Based on the context provided by the remaining transcript, you need to predict the most likely entity that was discussed during the missing sections. The entities to consider are:

01:

02:—PERSON: Names of individuals. Look for chances of greetings or pay attention to the context if it's referring to someone.

03:—AGE: Age information. Look for chances of birth date or a discussion about the age.

04:—ADDRESS: Specific addresses or descriptions of places. Pay attention if something about a person's residence is being discussed.

05:—LOCATION: General locations or places. Pay attention to discussions related to locations or places.

06:—PARENTHOOD: Information indicating parental relationships. Pay attention if something about a person's parenthood status is being discussed.

07:—MARITAL_STATUS: Information about marital status. Pay attention if something about a person's marital status is being discussed.

08:—OCCUPATION: Job titles or descriptions of work. Pay attention if something about a person's work status is being discussed.

09:—TELEPHONE: Phone numbers. Pay attention if something about a person's telephone number is being discussed.

10:—NON_PHI: Any other information that does not fall under the above categories. If you are certain that the no phi/pii related discussion was done based on the context around the timestamp.

11:

12: The transcript will be presented as follows:

13:

14: <TIMESTAMP1><asr_transcript><TIMESTAMP2> <asr_transcript>

15: . . .

16:

17: You are to output a JSON dictionary, where the keys are the timestamps of the missing sections, and the values are the most likely entities that were discussed. If it is not possible to determine a specific entity, label it as "UNKNOWN".

18:

19: input_example:

20: "John went to the store at 123 Main St. He bought some groceries and called his wife. <TIMESTAMP1> She was at work at the time. They planned to have dinner at 6 PM. <TIMESTAMP2>"

21:

22: output_example:

23: {

23: "TIMESTAMP1": "TELEPHONE",

24: "TIMESTAMP2": "NON_PHI"

25: }

26:

27: task:

28: Based on the context, fill in the missing entities, and return the result in the JSON dictionary format.

29:

30: partial_transcript:

31: {{transcript}}

The above template defines a specialized prompt for an LLM to analyze audio transcripts with missing segments and predict the nature of sensitive information within those gaps. The template structures the task of identifying personally identifiable information (PII) and protected health information (PHI) by providing nine specific entity categories: PERSON, AGE, ADDRESS, LOCATION, PARENTHOOD, MARITAL_STATUS, OCCUPATION, TELEPHONE, and NON_PHI (Line 00-Line 10). The template instructs the LLM to process a timestamped partial transcript where gaps are denoted by timestamp markers (Line 11-Line 31). Through contextual analysis of the surrounding text, the LLM is instructed to infer the most probable type of sensitive information discussed during a missing segment. The template requests output in a JSON dictionary format (Line 17), mapping timestamps to predicted entity types (e.g., Linc 22-Line 25), with an "UNKNOWN" designation for cases where entity type cannot be reliably determined (Line 17). The template includes specific guidance for entity recognition such as watching for greeting patterns to identify PERSON entities or location-related discussions for ADDRESS/LOCATION entities (e.g., Line 01-Line 10). An example input-output pair demonstrates the expected format and inference process (Line 19-Line 25), showing how the LLM should handle timestamp placeholders and assign appropriate entity categories based on contextual clues.

5. PRACTICAL APPLICATIONS; ADVANTAGES; IMPROVEMENTS

One or more embodiments automatically de-identify sensitive entities in audio conversations by combining un-transcribed voice activity detection (VAD) with large language model (LLM) analysis. The system obtains a speechto-text transcription of an audio conversation, where text tokens of the transcription are associated with timestamps. The system then processes portions of the audio data corresponding to specific time windows to detect un-transcribed voice activity-segments where the automatic speech recognition (ASR) may have failed to transcribe spoken words. To address these gaps, the system sends a prompt to an LLM that includes the text transcription with placeholders representing the un-transcribed time windows. The LLM analyzes the textual context surrounding the placeholders—examining the text before and after—to determine if a sensitive entity, such as personally identifiable information (PII) or protected health information (PHI), was likely spoken during those time windows. If the LLM indicates that a sensitive entity was spoken, the system processes the corresponding portions of the audio data to produce modified audio where the sensitive speech is audibly de-identified, for example, by muting or inserting beeps. The system stores the modified audio data in non-transitory, computer-readable media. The system enhances the de-identification process by leveraging the contextual understanding of LLMs to infer sensitive information in un-transcribed audio segments, thereby increasing the accuracy and completeness of automated audio de-identification compared to methods that rely solely on ASR outputs.

One or more embodiments solve the technical problem of incomplete de-identification of sensitive information in automated audio processing due to un-transcribed voice activity. Traditional automatic speech recognition (ASR) systems often fail to transcribe all spoken words in an audio conversation, especially when dealing with poor audio quality, diverse accents, or background noise. This failure leads to missed detection of sensitive entities, such as PII or PHI, posing significant risks for privacy breaches and non-compliance with data protection regulations. One or more embodiments address this issue by detecting un-transcribed voice activity within specific windows of the audio data and utilizing an LLM to infer, based on contextual analysis of surrounding transcribed text, if sensitive information is likely spoken during these intervals. By incorporating placeholders into the transcription and analyzing text before and after these placeholders, the system effectively identifies and de-identifies sensitive content that would otherwise be overlooked by ASR alone. This dual approach improves robustness in handling diverse linguistic patterns and challenging audio conditions, thereby increasing the reliability and effectiveness of the de-identification process and ensuring comprehensive protection of sensitive speech in the audio data.

6. EXAMPLE LLM ARCHITECTURE

Figure 9:
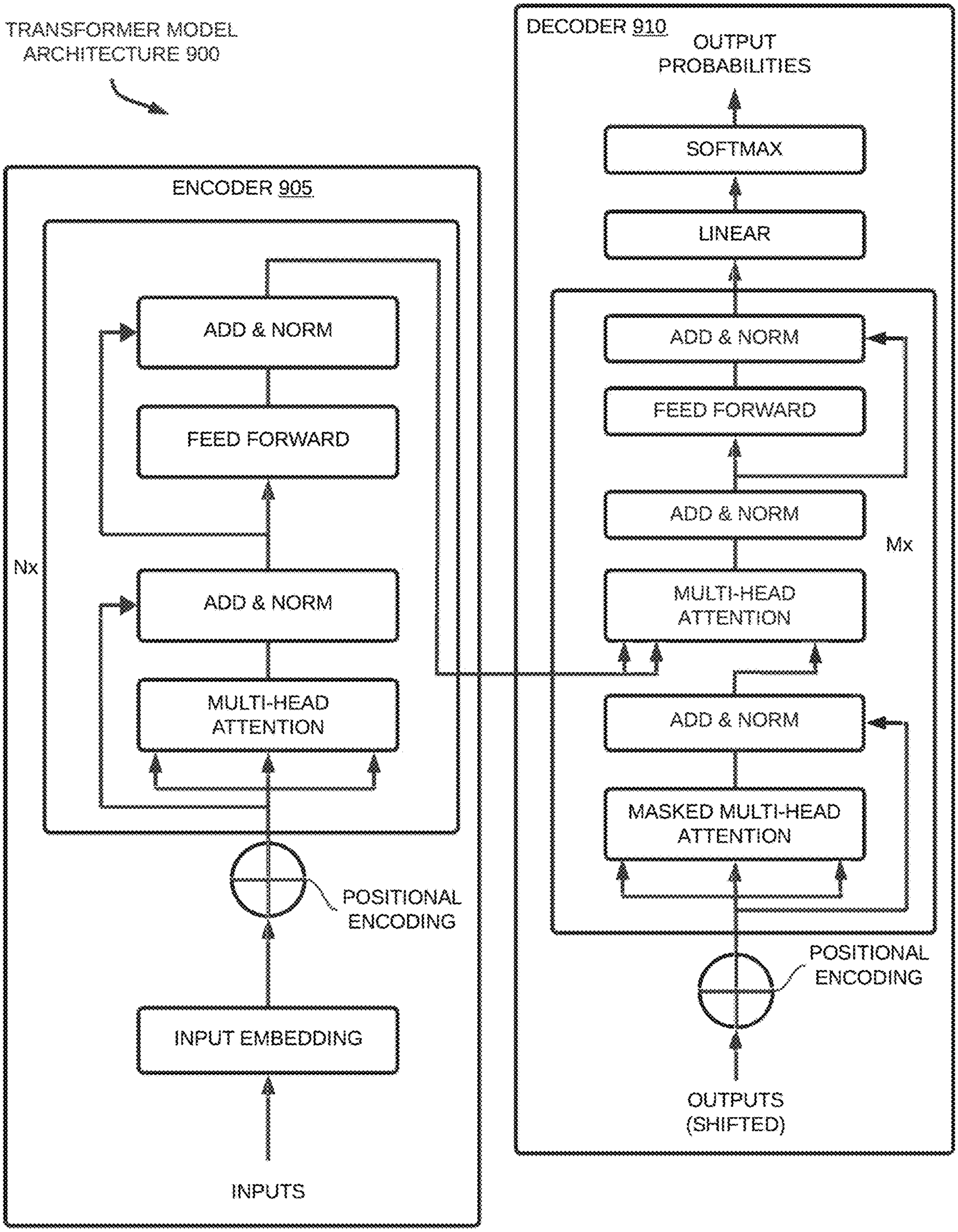
FIG. 9 illustrates an example transformer architecture that may be used in the implementation of a LLM in accordance with one or more embodiments.

FIG. 9 illustrates an example transformer model architecture 900 that may be used in an implementation of a LLM, such as LLM 122 described above with respect to FIG. 1, according to an embodiment of the present disclosure.

The transformer model architecture 900 may be a neural network design for natural language processing. At its core, the transformer 900 may encompass an encoder 905 and a decoder 910, both leveraging self-attention mechanisms. The architecture 900 may begin with an input embedding layer that converts tokens into high-dimensional vector representations that may range, for example, from 128 to 1024 dimensions. These embeddings may be augmented with positional encodings to retain sequence order information.

The transformer model architecture 900's input embedding layer serves as the initial processing stage for converting discrete tokens into continuous vector representations. These dense embeddings may occupy a high-dimensional space, with dimensionality configurations ranging from 128 to 1024, allowing for rich semantic representation of input tokens. The embedding process maps each token to a unique vector that captures the token's semantic properties in the continuous space. Positional encodings are subsequently added to these token embeddings through element-wise addition, introducing position-dependent signals that encode sequential information. These positional encodings can be implemented using sinusoidal functions or learned parameters, enabling the model to differentiate between tokens based on their positions in the sequence. The combined embeddings preserve both semantic content and sequential order, forming a foundation for the subsequent self-attention mechanisms. This embedding strategy addresses the inherent limitation of transformer architectures in processing sequential data, as the self-attention mechanism alone is position-agnostic.

The transformer 900 may include a multi-head, self-attention mechanism. This may allow the model 900 to simultaneously attend to different parts of the input sequence, capturing various types of relationships and dependencies. Each attention head may compute query, key, and value vectors, enabling the model to focus on relevant parts of the input when processing each token. Following the attention layers, the architecture 900 may incorporate feed-forward neural networks with multiple layers and non-linear activation functions.

The multi-head self-attention mechanism forms a component of the transformer architecture 900, enabling parallel processing of input sequence elements. Each attention head operates as an independent attention mechanism, computing three distinct matrices: queries (Q), keys (K), and values (V) through learned linear transformations of the input embeddings. The parallel nature of multiple attention heads allows the model to capture diverse relationship patterns within the same input sequence simultaneously, such as syntactic dependencies, semantic relationships, and long-range contextual connections. The attention computation follows the scaled dot-product attention formula, where the dot product between queries and keys determines alignment scores, followed by scaling and softmax normalization to produce attention weights. These weights are then applied to the value vectors, creating context-aware representations. The feed-forward neural networks following the attention layers consist of two linear transformations with a non-linear activation function (e.g., ReLU or GELU) between them, processing each position's output independently. This combination of self-attention and position-wise feed-forward networks enables the model to alternate between gathering contextual information across the sequence and applying complex transformations to individual positions, creating a powerful mechanism for sequence processing.

A masked, multi-head attention mechanism in the decoder 910 of a transformer model 900 may be designed to prevent the model from attending to future tokens during sequence generation. In this mechanism, multiple attention heads may operate in parallel, each computing query (Q), key (K), and value (V) matrices from the input embeddings. The attention scores may be calculated as the dot product of Q and K, scaled by the inverse square root of the dimension of the keys. A lower triangular mask may be applied to these attention scores before softmax normalization, effectively setting the upper triangular elements to negative infinity.

This masking may ensure that each position can only attend to previous positions in the sequence, maintaining the autoregressive property of the decoder. The masked attention scores may then be used to compute a weighted sum of the value vectors. The outputs from the heads may be concatenated and linearly transformed to produce the attention output. This process may allow the decoder to generate tokens sequentially while considering only the previously generated tokens, thus preserving the causal nature of language modeling.

The masked multi-head attention mechanism in the transformer's decoder 910 implements causal masking to enforce autoregressive generation during sequence processing. Each attention head performs linear projections to create query (Q), key (K), and value (V) matrices from input embeddings through learned weight matrices WQ, WK, and WV respectively. The attention computation follows the formula Attention (Q, K, V)=softmax (QKT/Vdk) V, where dk represents the dimensionality of the key vectors. A lower triangular mask matrix gets added to the attention scores before softmax normalization. This mask sets all upper triangular elements to negative infinity (−∞), effectively zeroing out these positions after the softmax operation. The masking operation ensures strict causality by preventing any position from attending to future positions in the sequence during both training and inference. Following the masked attention computation, the outputs from multiple attention heads are concatenated along the feature dimension and projected through a final linear transformation WO to produce the layer's output. This output maintains the temporal causality required for autoregressive generation while still allowing each position to attend to all previous positions in the sequence. The parallelized implementation of multiple attention heads enables the model to capture various aspects of the sequence history simultaneously, while the masking mechanism maintains the sequential nature of language generation.

To maintain stable training and mitigate vanishing gradients, the transformer 900 may employ layer normalization after each sub-layer (self-attention and feed-forward networks) and may introduce residual connections. These residual connections may allow unimpeded information flow through the network. The model may consist of multiple (Nx) encoder and decoder (Mx) layers stacked on top of each other, increasing its capacity to learn complex language patterns.

The transformer architecture incorporates stabilization techniques through layer normalization and residual connections. Layer normalization is applied after both the self-attention and feed-forward network sub-layers, normalizing the activations across the feature dimension for each token position. The normalization process computes the mean and variance of the features, then scales and shifts the normalized values using learned parameters gamma and beta, effectively standardizing the feature distributions throughout the network. Residual connections, implemented as skip connections, add the input of each sub-layer to the transformed output, creating direct paths for gradient flow during backpropagation. The combination of these components follows the formula LayerNorm (x+Sublayer (x)), where x represents the input and Sublayer represents either the self-attention or feed-forward network.

The stacking of multiple encoder and decoder layers increases the model's capacity logarithmically with respect to sequence length, enabling the capture of hierarchical patterns in language. Each additional layer in the stack provides an opportunity for more abstract feature representation, with lower layers capturing local patterns and higher layers learning more complex, global dependencies. The interaction between layer normalization and residual connections creates a well-conditioned optimization landscape, facilitating stable training of deep transformer networks while mitigating the vanishing gradient problem that commonly affects deep neural architectures.

The output layer may involve a linear transformation followed by a softmax function, producing probability distributions over the vocabulary for text generation tasks. This architecture 900's design may allow for efficient parallel processing of input sequences, making it particularly suitable for handling the extensive datasets used in training LLMs.

The output layer of the transformer architecture implements a vocabulary-sized classification mechanism through a linear transformation followed by softmax activation. The linear transformation projects the decoder's hidden states onto a vocabulary-sized space using a weight matrix W ∈ ℝ ^(d_model×|V|), where d_model represents the model's hidden dimension and |V| represents the vocabulary size. The subsequent softmax function normalizes these logits into a proper probability distribution across the entire vocabulary, computing P(token_i)=exp(z_i)/Σ_j exp (z_j), where z_i represents the logit for the i-th vocabulary token. This architectural design enables efficient batch processing of input sequences through matrix multiplications, leveraging modern hardware accelerators like GPUs and TPUs. The parallel computation capability stems from the self-attention mechanism's ability to process all sequence positions simultaneously during the forward pass, requiring only O(1) sequential operations compared to the O(n) operations needed in recurrent architectures. The model's parallelization efficiency scales particularly well with increasing sequence lengths, making the architecture advantageous for processing the extensive datasets used in large language model training, which often contain billions of tokens across diverse domains and languages.

In one or more embodiments, architectural variations enhance or modify the standard transformer design for LLM implementations. The Sparse Transformer introduces structured sparsity patterns in the attention mechanism, reducing the quadratic memory complexity to linear complexity through fixed attention patterns. This modification enables processing of much longer sequences while maintaining model quality. Reformer architectures employ locality-sensitive hashing for attention computation, approximating full attention while significantly reducing memory requirements. The Performer architecture replaces the attention mechanism with kernel-based formulations using random feature decomposition, achieving linear complexity in both compute and memory.

Alternate positional encoding schemes offer various trade-offs. Rotary positional embeddings (RoPE) inject positional information through rotation matrices applied to token embeddings, providing better relative position modeling. Alibi position embeddings add learned bias terms to attention scores, enabling better extrapolation to sequences longer than those seen during training. Some architectures eliminate explicit positional encodings entirely, instead relying on position-aware linear attention mechanisms.

Architecture modifications also target specific computational bottlenecks. Flash Attention optimizes attention computation through careful management of GPU memory access patterns. Mixture of Experts (MoE) architectures incorporate specialized sub-networks activated based on input patterns, increasing model capacity without proportional computation increases. The GLU (Gated Linear Unit) variants replace standard feed-forward networks with gated mechanisms, providing more flexible function approximation. Multi-query attention reduces memory bandwidth requirements by sharing key and value projections across attention heads while maintaining separate query projections.

Some architectures focus on improved training dynamics. DeepNorm modifies the layer normalization scheme to enable stable training of deeper networks. Gradient checkpointing strategies reduce memory requirements during training by recomputing certain activations during backpropagation. State space models offer an alternative to attention mechanisms entirely, using linear state space equations to model sequence relationships with improved computational efficiency.

Alternative architectures for LLM implementation encompass distinct paradigms beyond transformers. Recurrent Neural Networks (RNNs), particularly variants like Long Short-Term Memory (LSTM) networks and Gated Recurrent Units (GRUs), process sequences sequentially through hidden state updates. These architectures maintain explicit temporal dependencies through gating mechanisms, controlling information flow between timesteps. LSTM networks employ three gates-input, forget, and output-along with a memory cell to regulate information persistence. GRUs simplify this structure with reset and update gates while maintaining comparable performance.

Convolutional Neural Networks (CNNs) offer another approach through hierarchical feature extraction. Temporal Convolutional Networks (TCNs) apply dilated convolutions to capture long-range dependencies while maintaining autoregressive properties. The hierarchical structure of TCNs enables parallel processing within each layer while preserving causal relationships. Quasi-Recurrent Neural Networks (QRNNs) combine convolutional and recurrent approaches, using convolution for parallel feature extraction followed by a lightweight recurrent pooling mechanism.

Memory-augmented architectures present another paradigm. Neural Turing Machines (NTMs) and Differentiable Neural Computers (DNCs) supplement neural processing with external memory arrays, accessed through attention-like mechanisms. These architectures separate computation from memory storage, enabling more explicit modeling of long-term dependencies. Memory Networks similarly incorporate dedicated memory components but with more structured addressing mechanisms.

Continuous-time models offer an alternative perspective on sequence processing. Neural Ordinary Differential Equations (Neural ODEs) model sequence evolution as a continuous-time dynamical system, solving differential equations to process inputs. This approach enables variable timestep processing and potentially more natural handling of temporal relationships. Similarly, Neural Controlled Differential Equations (Neural CDEs) extend this framework to handle irregular time series data while maintaining end-to-end differentiability.

Graph Neural Networks (GNNs) provide yet another alternative by modeling sequences as structured graphs. This approach enables explicit modeling of hierarchical relationships and long-range dependencies through message passing between nodes. Graph-based architectures can capture complex dependencies that may be difficult to model with purely sequential approaches, though these architectures may require careful design of graph structure and update rules.

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, data storage, a virtual machine, a container, and/or a software application. Network resources are shared amongst multiple clients. Clients request computing services from a computer network independently of each other. Network resources are dynamically assigned to the requests and/or clients on an on-demand basis.

Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. Custom applications may be created using programming languages, libraries, services, and tools supported by the service provider. In laaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
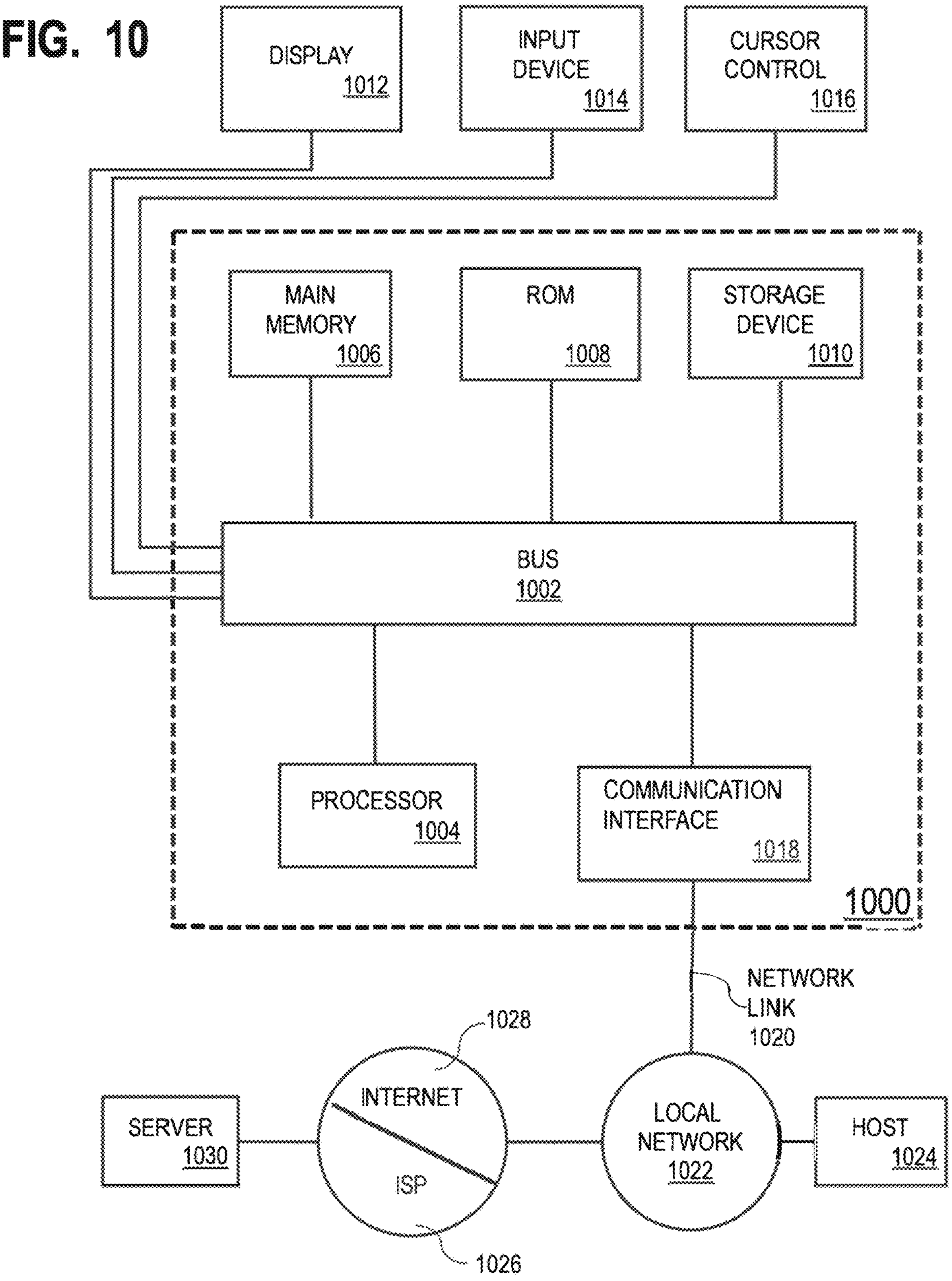
FIG. 10 illustrates an example computer system for use in an implementation of automatic de-identification of sensitive conversational audio data in accordance with one or more embodiments.

For example, FIG. 10 is a block diagram that illustrates a computer system 1000 upon which an embodiment of the disclosure may be implemented. Computer system 1000 includes a bus 1002 or other communication mechanism for communicating information, and a hardware processor 1004 coupled with bus 1002 for processing information. Hardware processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or a Solid-State Drive (SSD) is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device may have two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 may provide data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. MISCELLANEOUS; EXTENSIONS

Unless otherwise defined, all terms (including technical and scientific terms) are to be given their ordinary and customary meaning to a person of ordinary skill in the art and are not to be limited to a special or customized meaning unless expressly so defined herein.

This application may include references to certain trademarks. Although the use of trademarks is permissible in patent applications, the proprietary nature of the marks should be respected, and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. One or more non-transitory computer-readable media comprising instructions which, when executed by one or more hardware processors, cause performance of operations comprising:

obtaining text transcription data representing a speech-to-text transcription of an audio conversation, the text transcription data comprising text tokens and timestamps associated with text tokens;

identifying a portion of audio data corresponding to a time window in the audio conversation to analyze for any un-transcribed voice activity based at least in part on the timestamps associated with the text tokens;

processing at least the portion of the audio data corresponding to the time window in the audio conversation to detect an un-transcribed voice activity;

sending a prompt to a large language model (LLM), the prompt comprising a text transcription of at least a portion of the audio conversation, the text transcription comprising a placeholder in the text transcription that corresponds to the time window;

obtaining an output of the LLM based on sending the prompt to the LLM, wherein the output of the LLM indicates that a sensitive entity is spoken during the time window, and wherein the LLM determines that the sensitive entity is spoken during the time window based on text of the text transcription located before or after the placeholder in the text transcription;

applying a de-identification tactic to at least a portion of audio data corresponding to the time window to yield modified audio data; and storing the modified audio data in a non-transitory computer-readable media.

2. The one or more non-transitory computer-readable media of claim 1, wherein speaking of a sensitive entity during the time window is audibly muted or audibly bleeped when the modified audio data is audibly output.

3. The one or more non-transitory computer-readable media of claim 1, wherein the output indicates that a sensitive entity is spoken during the time window by specifying a sensitive entity type.

4. The one or more non-transitory computer-readable media of claim 1, the operations further comprising:

determining that the text transcription data indicates that there is no voice activity during the time window; and selecting the placeholder for inclusion in the text transcription of the prompt based on determining that the text transcription data indicates that there is no voice activity during the time window.

5. The one or more non-transitory computer-readable media of claim 1, the operations further comprising:

determining a plurality of candidate time windows in the audio conversation; and selecting, from the plurality of candidate time windows, a subset of one or more time windows to analyze for un-transcribed voice activity, wherein the subset of one or more time windows comprises the time window.

6. The one or more non-transitory computer-readable media of claim 1, the operations further comprising:

determining a plurality of candidate time windows in the audio conversation; and filtering the plurality of candidate time windows to select a subset of one or more time windows to analyze for un-transcribed voice activity based on time durations associated with the plurality of candidate time windows.

7. The one or more non-transitory computer-readable media of claim 1, the operations further comprising:

determining a plurality of candidate time windows in the audio conversation; and filtering the plurality of candidate time windows to select a subset of one or more time windows to analyze for un-transcribed voice activity based on an output of a large language model (LLM) that is prompted with one or more prompts to analyze a plurality of text transcriptions of a plurality of portions of the audio conversation encompassing the plurality of candidate time windows.

8. The one or more non-transitory computer-readable media of claim 1, the operations further comprising:

identifying a text token of the text transcription data as a sensitive entity;

using one or more timestamps in the text transcription data associated with the text token to determine a range of time in the audio conversation to be audibly deidentified; and wherein the range of time in the audio conversation is audibly deidentified when the modified audio data is audibly output.

9. The one or more non-transitory computer-readable media of claim 8, the operations further comprising:

determining the range of time in the audio conversation to be audibly deidentified based on a start timestamp in the text transcription data associated with the text token, an end timestamp in the text transcription data associated with the text token, and a predetermined margin of error time amount.

10. A method comprising:

obtaining text transcription data representing a speech-to-text transcription of an audio conversation, the text transcription data comprising text tokens and timestamps associated with text tokens;

identifying a portion of audio data corresponding to a time window in the audio conversation to analyze for any un-transcribed voice activity based at least in part on the timestamps associated with the text tokens;

processing at least the portion of the audio data corresponding to the time window in the audio conversation to detect an un-transcribed voice activity;

sending a prompt to a large language model (LLM), the prompt comprising a text transcription of at least a portion of the audio conversation, the text transcription comprising a placeholder in the text transcription that corresponds to the time window;

obtaining an output of the LLM based on sending the prompt to the LLM, wherein the output of the LLM indicates that a sensitive entity is spoken during the time window, and wherein the LLM determines that the sensitive entity is spoken during the time window based on text of the text transcription located before or after the placeholder in the text transcription;

applying a de-identification tactic to at least a portion of audio data corresponding to the time window to yield modified audio data; and storing the modified audio data in a non-transitory computer-readable media.

11. The method of claim 10, wherein speaking of a sensitive entity during the time window is audibly muted or audibly bleeped when the modified audio data is audibly output.

12. The method of claim 10, wherein the output indicates that a sensitive entity is spoken during the time window by specifying a sensitive entity type.

13. The method of claim 10, further comprising:

determining that the text transcription data indicates that there is no voice activity during the time window; and selecting the placeholder for inclusion in the text transcription of the prompt based on determining that the text transcription data indicates that there is no voice activity during the time window.

14. A system comprising:

at least one device having a hardware processor; and instructions which, when executed, cause the system to perform operations comprising:

obtaining text transcription data representing a speech-to-text transcription of an audio conversation, the text transcription data comprising text tokens and timestamps associated with text tokens;

identifying a portion of audio data corresponding to a time window in the audio conversation to analyze for any un-transcribed voice activity based at least in part on the timestamps associated with the text tokens;

processing at least the portion of the audio data corresponding to the time window in the audio conversation to detect an un-transcribed voice activity;

sending a prompt to a large language model (LLM), the prompt comprising a text transcription of at least a portion of the audio conversation, the text transcription comprising a placeholder in the text transcription that corresponds to the time window;

obtaining an output of the LLM based on sending the prompt to the LLM, wherein the output of the LLM indicates that a sensitive entity is spoken during the time window, and wherein the LLM determines that the sensitive entity is spoken during the time window based on text of the text transcription located before or after the placeholder in the text transcription;

applying a de-identification tactic to at least a portion of audio data corresponding to the time window to yield modified audio data; and storing the modified audio data in a non-transitory computer-readable media.

15. The system of claim 14, the operations further comprising:

determining a plurality of candidate time windows in the audio conversation; and filtering the plurality of candidate time windows to select a subset of one or more time windows to analyze for un-transcribed voice activity based on time durations associated with the plurality of candidate time windows.

16. The system of claim 14, the operations further comprising:

determining a plurality of candidate time windows in the audio conversation; and filtering the plurality of candidate time windows to select a subset of one or more time windows to analyze for un-transcribed voice activity based on an output of a large language model (LLM) that is prompted with one or more prompts to analyze a plurality of text transcriptions of a plurality of portions of the audio conversation encompassing the plurality of candidate time windows.

17. The system of claim 14, the operations further comprising:

identifying a text token of the text transcription data as a sensitive entity;

using one or more timestamps in the text transcription data associated with the text token to determine a range of time in the audio conversation to be audibly deidentified; and wherein the range of time in the audio conversation is audibly deidentified when the modified audio data is audibly output.

18. The system of claim 17, the operations further comprising:

determining the range of time in the audio conversation to be audibly deidentified based on a start timestamp in the text transcription data associated with the text token, an end timestamp in the text transcription data associated with the text token, and a predetermined margin of error time amount.

* * * * *